US008142902B2

(12) United States Patent
Stadlbauer et al.

(10) Patent No.: US 8,142,902 B2
(45) Date of Patent: *Mar. 27, 2012

(54) EXTRUSION COATED SUBSTRATE

(75) Inventors: Manfred Stadlbauer, Linz (AT); Manfred Kirchberger, Prambachkirchen (AT); Eberhard Ernst, Unterweitersdorf (AT)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/367,856

(22) Filed: Feb. 9, 2009

(65) Prior Publication Data

US 2009/0169907 A1 Jul. 2, 2009

Related U.S. Application Data

(63) Continuation of application No. PCT/EP2007/007469, filed on Aug. 24, 2007.

(30) Foreign Application Priority Data

Aug. 25, 2006 (EP) .................................. 06017788

(51) Int. Cl.
*B32B 15/085* (2006.01)
*B32B 27/10* (2006.01)
*B32B 27/32* (2006.01)

(52) U.S. Cl. ........ 428/523; 428/461; 428/500; 428/511; 428/513

(58) Field of Classification Search .................. None
See application file for complete search history.

(56) References Cited

U.S. PATENT DOCUMENTS

| 4,304,890 | A | 12/1981 | Suzuki et al. |
| 4,404,342 | A | 9/1983 | Miyoshi et al. |
| 4,483,971 | A | 11/1984 | Sato et al. |
| 4,634,745 | A | 1/1987 | Ehrig et al. |
| 4,701,432 | A | 10/1987 | Welborn, Jr. |
| 4,808,561 | A | 2/1989 | Welborn, Jr. |
| 5,250,631 | A | 10/1993 | McCullough, Jr. |
| 5,326,625 | A | 7/1994 | Schuhmann et al. |
| 5,948,547 | A | 9/1999 | Mikielski et al. |
| 6,086,982 | A | 7/2000 | Peiffer et al. |
| 6,225,432 | B1 | 5/2001 | Weng et al. |
| 6,805,930 | B2 | 10/2004 | Hanada et al. |
| 7,342,078 | B2 * | 3/2008 | Schottek et al. ............. 526/160 |
| 2002/0173602 | A1 | 11/2002 | Appleyard |
| 2002/0198318 | A1 | 12/2002 | Obata |
| 2004/0010087 | A1 | 1/2004 | Obata |
| 2004/0072005 | A1 | 4/2004 | German et al. |
| 2005/0090571 | A1 | 4/2005 | Mehta |

FOREIGN PATENT DOCUMENTS

| DE | 2827764 | 1/1980 |
| DE | 203 915 | 11/1983 |
| DE | 3 539 352 | 5/1986 |
| DE | 198 27 327 | 12/1999 |
| DE | 199 49 235 | 5/2000 |
| EP | 0 36 457 | 9/1981 |
| EP | 0 190 889 | 8/1986 |
| EP | 0 384 431 | 8/1990 |
| EP | 395204 | 10/1990 |
| EP | 0 887 379 | 12/1990 |
| EP | 0 674 325 | 9/1995 |
| EP | 0 674 991 | 10/1995 |
| EP | 0 690 458 | 1/1996 |
| EP | 0 747 212 | 11/1996 |
| EP | 0 745 637 | 12/1996 |
| EP | 0 873 862 | 10/1998 |
| EP | 0 879 830 | 11/1998 |
| EP | 0 885 918 | 12/1998 |
| EP | 0 893 802 | 1/1999 |
| EP | 0 919 572 | 6/1999 |
| EP | 0 942 013 | 9/1999 |
| EP | 1 295 910 | 3/2003 |
| EP | 1 302 310 | 4/2003 |
| EP | 1 367 068 | 12/2003 |
| EP | 1 408 077 | 4/2004 |
| EP | 1 429 346 | 6/2004 |
| EP | 1 484 345 | 12/2004 |
| EP | 1 495 861 | 1/2005 |
| EP | 1595802 | 11/2005 |
| EP | 1 634 699 | 3/2006 |
| EP | 1 724 289 | 11/2006 |
| EP | 1 726 602 | 11/2006 |
| EP | 1 726 603 | 11/2006 |
| EP | 1 847 551 | 10/2007 |
| EP | 1 847 552 | 10/2007 |

(Continued)

OTHER PUBLICATIONS

Chujo, R. Heptad configurational analysis of 13C N.M.R. spectra in highly isotactic polypropylene, *Polymer* 29, vol. 29, Jan., pp. 138-143 (1988).

Chujo R. Two-site model analysis of 13C n.m.r, of polypropylene polymerized by Ziegler-Natta catalyst with external alkoxysilane donors, *Polymer*, vol. 35, part II, pp. 339-342 (1994).

Sentmanat, Rheol, *Measuring the Transient Extension Rheoloav of Polythylene Melts Using the SER Universal Testing Platform*, J. Rheology, May/Jun. Issue, pp. 1-20 (2005).

Zimm, B.H. and Stockmayer, Walter The Dimension of Chain Molecules Containing Branches and Rings, *The Journal of Chemical Physics*, vol. 17, No. 12, pp. 1301-1314 (1949).

Hayashi, et al., 13C N.M.R. spectral assignments and hexad comonomer sequence determination in stereoregular ethylene-propylene copolymer, *Polymer*, vol. 29, pp. 1848-1847 (1988).

(Continued)

*Primary Examiner* — Monique Jackson

(74) *Attorney, Agent, or Firm* — McAndrews, Held & Malloy, Ltd.

(57) ABSTRACT

Certain embodiments provide an article comprising a substrate, wherein the substrate is extrusion coated with a composition comprising a multi-branched polypropylene having a g' of less than 1.00. In certain embodiments, the substrate is extrusion coated with a composition comprising a polypropylene material. Either the composition and/or the polypropylene material are represented by the equation:

$$\text{Vicat } B \, [°C.] \geq -3.96 \cdot C_x \, [\text{mol \%}] + 86.85;$$

wherein Vicat B is the heat resistance, according to ISO 306 (50 N), of the composition and/or the polypropylene material; and $C_x$ is the comonomer content the composition and/or the polypropylene material.

32 Claims, 6 Drawing Sheets

FOREIGN PATENT DOCUMENTS

| | | |
|---|---|---|
| EP | 1 847 555 | 10/2007 |
| EP | 1882703 | 1/2008 |
| JP | 2001/0168431 | 6/1999 |
| JP | 2001/354 814 | 7/2000 |
| JP | 2003 147110 | 11/2001 |
| JP | 2002 363356 | 12/2002 |
| JP | 2002363356 A * | 12/2002 |
| JP | 2006/022 276 | 6/2004 |
| WO | WO 94/28034 | 12/1994 |
| WO | WO 95/30708 | 11/1995 |
| WO | WO 97/22633 | 6/1997 |
| WO | WO 92/12182 | 7/1997 |
| WO | WO 98/10016 | 3/1998 |
| WO | WO 98/58971 | 12/1998 |
| WO | WO 99/09096 | 2/1999 |
| WO | WO 99/24478 | 5/1999 |
| WO | WO 99/29742 | 6/1999 |
| WO | WO 00/12572 | 3/2000 |
| WO | WO0063287 | 10/2000 |
| WO | WO 00/68315 | 11/2000 |
| WO | WO 00/73369 | 12/2000 |
| WO | WO 00/78858 | 12/2000 |
| WO | WO 01/25296 | 4/2001 |
| WO | WO 01/48034 | 7/2001 |
| WO | WO 01/98409 | 12/2001 |
| WO | WO 02/16455 | 2/2002 |
| WO | WO 02/44251 | 6/2002 |
| WO | WO 02/090400 | 11/2002 |
| WO | WO 03/000754 | 1/2003 |
| WO | WO 03/040233 | 5/2003 |
| WO | WO 03/051934 | 6/2003 |
| WO | WO 2004/013193 | 2/2004 |
| WO | WO2004/026921 | 4/2004 |
| WO | WO 2004/037871 | 5/2004 |
| WO | WO 2004/046208 | 6/2004 |
| WO | WO 2004/052950 | 6/2004 |
| WO | WO2004101673 | 11/2004 |
| WO | WO2005030811 | 4/2005 |
| WO | WO 2005/044877 | 5/2005 |
| WO | WO2006065651 | 6/2006 |
| WO | WO 2006/118890 | 11/2006 |
| WO | WO 2008/022803 | 2/2008 |

OTHER PUBLICATIONS

Polypropylene Process Review, Does Borstar shine?, *ECN Chemscope*, May 1999, pp. 17-18, 20-21.

Pinter, Gerald et al., *Accelerated quality assurance tests for PE pipe grades*, 64$^{th}$ Annual Technical Conference, pp. 2080-2084, Society of Plastics Engineers, (2006).

Cazenave, J., et al., *Short-term mechanical and structural approaches for the evaluation of polyethylene stress crack resistance* Groupe d'Etude de Metallurgie Physique et de Physique des Materiaux, *Polymer* 47, pp. 3904-3914 (2006).

Gahleitner, Markus et al., Propylene-ethylene random copolymers: comonomer effects on crystallinity and application properties, *Journal of Applied Polymer Science*, (2005), 95(5), 1073-1081; AAAAAAA.

Haager, Markus et al., *Estimation of slow crack growth behavior in polyethylene after stepwise isothermal crystallization*, Macromolecular Symposia (2004), 217 (Contributions from 6$^{th}$ Austrian Polymer Meeting, 2003), 383-390; AAAAAAA.

Nezbedova, E et al., Influence of processing conditions on the structural and fracture behavior of PP pipe grades, *Journal of Macromolecular Science*, Part B Physics, B41 Nos. 4-6, pp. 711-723, (2002).

Nezbedova, E. et al., Brittle failure versus structure of HDPE pipe resins, *Journal of Macromolecular Science*, Part B Physics, B40 3&4, pp. 507-515, (2001).

Nezbedova, E, et al., Relation of slow crack growth failure time to structure of HDPE, *Mechanics of Time-Dependent Materials* 5, pp. 67-78, (2001).

Nezbedova, E., et al., The Relationship Between Fracture Behavior and Structural Parameters of HDPE, *Plastics Pipeline Systems for the Millenium*, pp. 349-357 (1998).

Lodefier, Ph., et al., Chemical Heterogeneity of Poly(ethylene terephthalate) As Revealed by Temperature Rising Elution Fractionation and Its Influence on Polymer Thermal Behavior: A Comparison with Poly(ethylene terephthalate-co-isophthalate) *Macromolecules*, vol. 32 No. 21, pp. 7135-7139 (1999).

Hanyu, Aiko et al., Properties and film applications of metallocene-based isotactic polypropylenes. *Journal of Plastic Film & Sheeting*, vol. 15 No. 5, pp. 109-119, (1999).

Gueugnaut, D., et al., Detection of divergences in polyethylene resins fabrication by means of the modified stepwise isothermal segregation technique, *Journal of Applied Polymer Science*, vol. 73 No. 11, pp. 2103-2112, (1999).

Scholten F.L., et al., GERG materials bank of PE gas pipe grades. Recent developments, *Proceedings of the International Gas Research Conference*, vol. 3, pp. 257-268, (1998).

Hanyu, Aiko, et al., Properties and film applications of metallocene-based isotactic polypropylenes, 56$^{th}$ *Society of Plastics Engineers Annual Technical Conference*, vol. 2, pp. 1887-1891, (1998).

Ishikawa, Narumi, Study on the physical properties of polyethylene pipes for gas, *Nisseki Rebyu* Nippon Sekiyu, 32-(4), pp. 153-158, 1990.

Rätzsch, Radical reactions on polypropylene in the solid state, *Progress in Polymer Science*, Issue 27, pp. 1195-1282 (2002).

J. Dealy, "Structure and Rheology of Molten polymers", *Hanser Publishers Munich*, Germany, pp. 377-386, 2006.

Naguib E. Hani, Fundamental Foaming Mechanisms Governing the Volume Expansion of Extruded Polypropylene Foams, *Journal Applied. Poly. Science*, 91 pp. 2662-2668, (2008).

S. T. Lee, Foam Extrusion Principles and Practice, *Technomic Publishing*, pp. 1-15 (2000).

Virkkunen, Ville, et. al, Tacticity distribution of isotactic polypropylene prepared with heterogeneous Ziegler-Natta Catalyst. 2. Application and analysis of SSA data for polypropylene. *Polymer*, vol. 45, pp. 4623-4631, (2004).

Maria de Fátima Vieira Marques, et, al, Propylene Polymerization using combined Syndio- and isospecific metallocene catalysts supported on silica/MAO, *Journal of Applied Polymer Science*, vol. 99, pp. 628-637, (2006).

Spaleck, Walter Synthesis and Properties of Metallocene Catalysts for Isotopic Polypropylene Production, *Metallocene-based Polyoefins*, pp. 400-424, (2000).

J Krupka, R G Geyer, J Baker-Jarvis and J Ceremuga, 'Measurements of the complex permittivity of microwave circuit board substrates using a split dielectric resonator and re-entrant cavity techniques', Proceedings of the Conference on Dielectric Materials, Measurements and Applications—DMMA '96, Bath, UK, published by the IEE, London, 1996.].

J Krupka, R N Clarke, O C Rochard and A P Gregory, 'Split-Post Dielectric Resonator technique for precise measurements of laminar dielectric specimens—measurement uncertainties', Proceedings of the XIII Int. Conference MIKON'2000, Wroclaw, Poland, pp. 305-308, 2000.

Ed. J. Sheirs, W. Kaminski, "Metallocenebased Polyolefines" vol. 1 (1999) 401-424.

Product info sheet, Basell Polyolefins Company, "Pro-faxPF814", pp. 1 and 2.

The Dow Company, Commercial Product JQDB-2230NT of Dow, "Technical information for wire and cable" Telecom, pp. 1-2, Mar. 2005.

Product info sheet, Borealis Tech, "High-Melt Strength Polypropylene for Foam Excursion" pp. 1-4, edition 8 (2004).

Product information sheet, Polypropylene Daploy TM WB130HMS High-Melt Strength Polypropylene for Foam Extrusion, Oct. 20, 2004.

Gahleitner, Markus et al., "Propylene-Ethylene Random Copolymers: Comonomer Effects on Crystallinity and Application Properties," Journal of Applied Polymer Science, 95(5), pp. 1073-1081, (2005).

Haager, Markus et al., "Estimation of Slow Crack Growth Behavior in Polyethylene After Stepwise Isothermal Crystallization," Macromolecular Symposia, 217, pp. 383-390, (2004).

Hanyu, Aiko, et al., "Properties and Film Applications of Metallocene-Based Isotactic Polypropylenes," Journal of Plastic Film and Sheeting, vol. 15, pp. 109-119, Apr. 1999.

Ishikawa, Narumi, "Study on the Physical Properties of Polyethylene for Gas," Nisseki Rebyu Nippon Sekiyu, 32-(4), pp. 153-158, 1990.

J. Krupka, et al., "Measurements of the Complex Permittivity of Microwave Circuit Board Substrates Using a Split Dielectric Resonator and Re-entrant Cavity Techniques," Proceedings of the Conference on Dielectric Materials, Measurements and Applications—DMMA '96, Bath, UK, published by the IEE, London, 1996.

J. Krupka, et al., "Split-Post Dielectric Resonator Technique for Precise Measurements of Laminar Dielectric Specimens—Measurement Uncertainties," Proceedings of the XIII Int. Conference Mikon 2000, Wroclaw, Poland, pp. 305-308, 2000.

J. Sheirs, W. Kaminski, "Metallocene-based Polyolefins," vol. 1, pp. 401-423, (1999).

* cited by examiner

Determination of the SHI of WB130HMS at a strain rate of $0.1s^{-1}$ (SHI@$0.1s^{-1}$ is determined to be 2.06)

| Laminator | Extruder 1 and 2 in operation | Substrate |
|---|---|---|
| Up to 1000m/min | 4,5", L/D 24, Compression 4.0, Output 450kg/hr | Paper UG Kraft |

Extrusion Coating Setup

Vicat B of mPP and znPP as function of ethylene content for homo- and copolymers

EXTRUSION COATED SUBSTRATE

RELATED APPLICATIONS

This application is a continuation of International Application Serial No. PCT/EP2007/007469 (International Publication Number WO 2008/022803), having an International filing date of Aug. 24, 2007 entitled "Extrusion Coated Substrate". International Application No. PCT/EP2007/007469 claimed priority benefits, in turn, from European Patent Application No. 06017788.8, filed Aug. 25, 2006. International Application No. PCT/EP2007/007469 and European Application No. 06017788.8 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology relates to an extrusion coated substrate. Furthermore, it relates to the use of multi-branched polypropylene for the preparation of an extrusion coated substrate.

In the process of extrusion coating, a substrate is coated with a particular polymer so as to provide a specific functionality such as sealability to said substrate. Examples include juice and milk packings, typically having an interior polymer extrusion coated onto a foil substrate. In general, extrusion coating of substrates such as paper, paperboard, fabrics and metal foils with a thin layer of plastic is practiced on a large scale. The polymer is extruded first whereby the flux of molten polymeric material passes through a flat die to obtain a film a few microns thick, followed by a coating step, whereby the film is laid on a support and passes on a cooling cylinder. Upon cooling, the polymer adheres to its support.

The plastic most often used is low density polyethylene, a polymer which is readily extruded as a thin coating onto the surface of a moving substrate at high rates of speed. For some coating applications, crystalline polypropylene is a more desirable coating material than polyethylene due to its higher stiffness and higher heat resistance.

However, since many polypropylene materials suffer from low melt strength and low melt extensibility, they show poor processibility in high speed extrusion coating. At present, only a few polypropylene-based systems are available in the industry for extrusion coating. According to one approach for improving processibility, low density polyethylene is added to a polypropylene prepared in the presence of a Ziegler/Natta catalyst, as described e.g. in GB 992 388. In JP 2002 363356, low density polyethylene is added to a polypropylene prepared in the presence of a single site catalyst. EP-A-109 006 8 discloses a blend of a propylene homopolymer with a propylene copolymer of low crystallinity.

By blending polypropylene prepared in the presence of Ziegler/Natta catalysts or single site catalysts with either low density polyethylene or propylene copolymers of low crystallinity, processability can be improved but the level of extractables increases dramatically at moderate gel level. However, for food and beverage packaging as well as for medical packaging, high levels of extractables are not acceptable.

Furthermore, significant amounts of low density polyethylene or propylene copolymers of low crystallinity adversely affect thermal resistance as well as dimensional stability at elevated temperature. However, for many applications the extrusion coated substrate should have high thermal resistance and/or dimensional stability at elevated temperature.

According to EP-A-0947551, processibilty is improved by post-reactor modification, such as treatment by irradiation or free radicals. However, although known post-reactor modification processes can improve processibility, they result in a high level of extractables. Furthermore, the gel-rating of post-reactor modified resins is typically high.

BRIEF SUMMARY OF THE INVENTION

Thus, considering the problems outlined above, it is an object of the present technology to provide a polypropylene-based extrusion coated substrate which can be obtained at high extrusion coating rate but still has a low content of extractables in combination with high heat stability.

The finding of the present technology is to provide an article comprising a substrate which is extrusion coated with a composition based on polypropylene being multi-branched, i.e. not only the polypropylene backbone is furnished with a larger number of side chains (branched polypropylene) but also some of the side chains themselves are provided with further side chains.

Hence, the present technology is related, in a first embodiment, to an article comprising a substrate which is extrusion coated with a composition comprising a polypropylene, wherein said polypropylene is produced in the presence of a metallocene catalyst, preferably in the presence of a metallocene catalyst as further defined below, and said composition and/or said polypropylene has (have)

a. a branching index g' of less than 1.00 and b. a strain hardening index (SHI@1 s$^{-1}$) of at least 0.30 measured by a deformation rate dε/dt of 1.00 s$^{-1}$ at a temperature of 180° C., wherein the strain hardening index (SHI) is defined as the slope of the logarithm to the basis 10 (log or log) of the tensile stress growth function ($\log(\eta_E^+)$) as a function of the logarithm to the basis 10 of the Hencky strain (log (ε)) in the range of Hencky strains between 1 and 3.

Preferably the composition is free of polyethylene, even more preferred the composition comprises a polypropylene as defined above and further defined below as the only polymer component.

Surprisingly, it has been found that articles with such characteristics have superior properties compared to the articles known in the art. Especially, the melt of the composition in the extrusion process has a high stability, i.e. the extrusion line can be operated at a high screw speed. In addition the inventive article, in particular the composition of said article, is characterized by high heat stability in combination with low levels of extractables.

Certain embodiments provide an article comprising a substrate. The substrate is extrusion coated with a composition comprising a polypropylene material. Either the composition and/or the polypropylene material are represented by the equation:

$$\text{Vicat } B \, [°\text{C.}] > -3.96 \cdot C_x \, [\text{mol \%}] + 86.85;$$

wherein:
a) Vicat B is the heat resistance, according to ISO 306 (50 N), of the composition and/or the polypropylene material; and
b) $C_x$ is the comonomer content in the composition and/or the polypropylene.

In certain embodiments, the composition and/or the polypropylene material have xylene solubles of less than 2.0 wt % (percent by weight). Certain embodiments provide methods for producing the aforementioned article and methods for using the article, for example, using the article as a packaging material.

Certain embodiments provide an article comprising a substrate. The substrate is extrusion coated with a composition comprising a polypropylene material. The polypropylene material is produced in the presence of a metallocene catalyst, and either the composition and/or the polypropylene have:
a) a branching index g' of less than 1.00; and
b) a strain hardening index of at least 0.30 measured by a deformation rate of 1.00 s$^{-1}$ at a temperature of 180° C.

wherein the strain hardening index is defined as a slope of a logarithm to the basis 10 of a tensile stress growth function as a function of a logarithm to the basis 10 of a Hencky strain in a range of Hencky strains between 1 and 3.

In certain embodiments of the articles of the present technology, either the composition and/or the polypropylene material have a multi-branching index of at least 0.15. The multi-branching index is defined as a slope of strain hardening index as a function of the logarithm to the basis 10 of a Hencky strain rate, defined as (log(dε/dt)), wherein:
a) dε/dt is the deformation rate,
b) ε is the Hencky strain, and
c) the strain hardening index is measured at a temperature of 180° C., wherein the strain hardening index is defined as a slope of a logarithm to the basis 10 of the tensile stress growth function as a function of a logarithm to the basis 10 of the Hencky strain in the range of Hencky strains between 1 and 3.

DETAILED DESCRIPTION OF THE INVENTION

Figure 1:
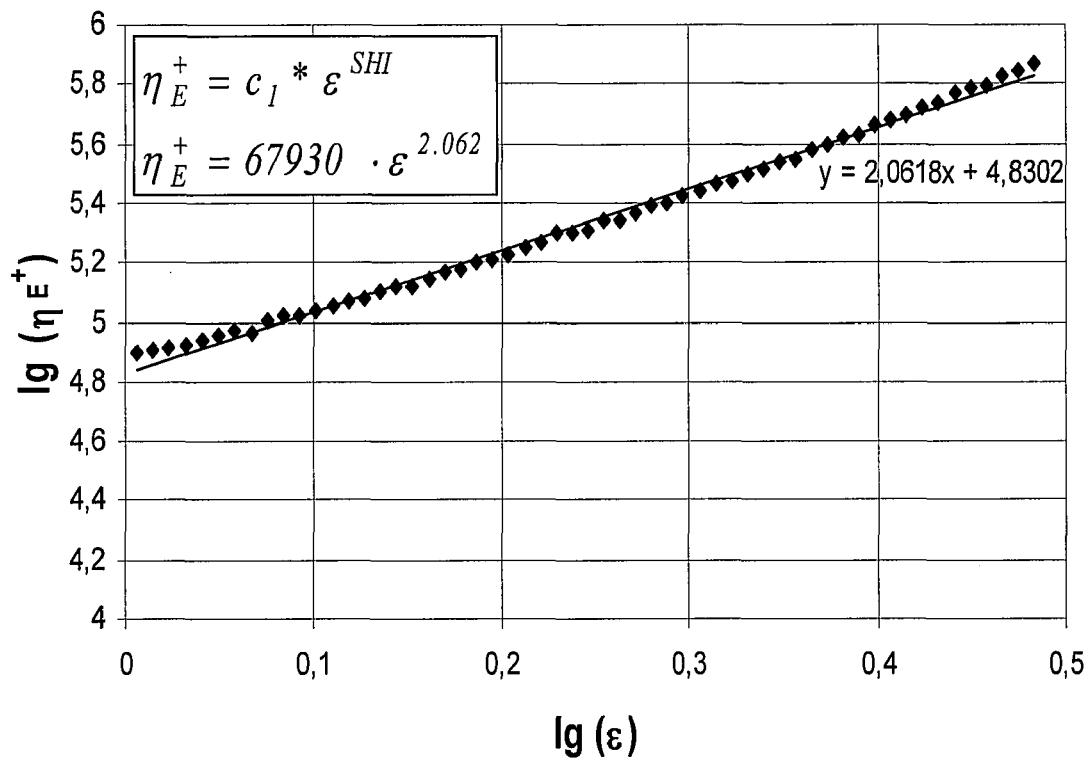
FIG. 1 is a graph depicting the determination of the SHI of "A" at a strain rate of 0.1 s$^{-1}$ (SHI@0.1 s$^{-1}$ is determined to be 2.06).

As stated above, one characteristic of the inventive article is the extensional melt flow properties of the composition and/or the polypropylene component of said composition, which is extrusion coated on the substrate. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

Accordingly one preferred requirement of the present technology is that the polypropylene of the article has a branching index g' of less than 1.00, more preferably less than 0.90, still more preferably less than 0.80. In the preferred embodiment, the branching index g' shall be less than 0.75. The branching index g' defines the degree of branching and correlates with the amount of branches of a polymer. The branching index g' is defined as g'=[IV]$_{br}$/[IV]$_{lin}$ in which g' is the branching index, [IV]$_{br}$ is the intrinsic viscosity of the branched polypropylene and [IV]$_{lin}$ is the intrinsic viscosity of the linear polypropylene having the same weight average molecular weight (within a range of 110%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith incorporated by reference.

When measured on the composition, which is extrusion coated on the substrate, the branching index g' is preferably less than 1.00, more preferably less than 0.90, still more preferably less than 0.80. In the preferred embodiment, the branching index g' of the composition, which is extrusion coated on the substrate, shall be less than 0.75. In this case of course the whole composition is used for [IV]$_{br}$.

The intrinsic viscosity needed for determining the branching index g' is measured according to DIN ISO 1628/1, October 1999 (in Decalin at 135° C.).

A further preferred requirement is that the strain hardening index (SHI@1 s$^{-1}$) of the polypropylene of the article, i.e. the polypropylene comprised in the composition being extrusion coated on the substrate, shall be at least 0.30, more preferred of at least 0.40, still more preferred of at least 0.50. In a preferred embodiment the strain hardening index (SHI@1 s$^{-1}$) is at least 0.55.

The strain hardening index is a measure for the strain hardening behavior of the polymer melt, in particular of the polypropylene melt. In the present technology, the strain hardening index (SHI@1 s$^{-1}$) has been measured by a deformation rate dε/dt of 1.00 s$^{-1}$ at a temperature of 180° C. for determining the strain hardening behavior, wherein the strain hardening index (SHI) is defined as the slope of the tensile stress growth function $\eta_E^+$ as a function of the Hencky strain ε on a logarithmic scale between 1.00 and 3.00 (see FIG. 1). Thereby the Hencky strain ε is defined by the formula ε=$\dot{\epsilon}_H$·t, wherein the Hencky strain rate $\dot{\epsilon}_H$ is defined by the formula $$\dot{\varepsilon}_H = \frac{2 \cdot \Omega \cdot R}{L_0}[s^{-1}]$$

with

"$L_0$" is the fixed, unsupported length of the specimen sample being stretched which is equal to the centerline distance between the master and slave drums "R" is the radius of the equi-dimensional windup drums, and "Ω" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H \cdot A(\varepsilon)} \text{ with}$$

$$T(\varepsilon) = 2 \cdot R \cdot F(\varepsilon) \text{ and}$$

$$A(\varepsilon) = A_0 \cdot \left(\frac{d_S}{d_M}\right)^{2/3} \cdot \exp(-\varepsilon) \text{ wherein}$$

the Hencky strain rate $\dot{\varepsilon}_H$ is defined as for the Hencky strain $\varepsilon$ "F" is the tangential stretching force "R" is the radius of the equi-dimensional windup drums "T" is the measured torque signal, related to the tangential stretching force "F"

"A" is the instantaneous cross-sectional area of a stretched molten specimen

"$A_0$" is the cross-sectional area of the specimen in the solid state (i.e. prior to melting), "$d_s$" is the solid state density and "$d_M$" the melt density of the polymer.

When measured on the composition, which is extrusion coated on the substrate, the strain hardening index (SHI@1 s$^{-1}$) is preferably at least 0.30, more preferred of at least 0.40, yet more preferred the strain hardening index (SHI@1 s$^{-1}$) is of at least 0.40. In a preferred embodiment the strain hardening index (SHI@1 s$^{-1}$) is at least 0.55.

Another physical parameter which is sensitive to heat resistance and the strain rate thickening is the so-called multi-branching index (MBI), as will be explained below in further detail.

Similarly to the measurement of SHI@1 s$^{-1}$, a strain hardening index (SHI) can be determined at different strain rates. A strain hardening index (SHI) is defined as the slope of the logarithm to the basis 10 of the tensile stress growth function $\eta_E^+$, log($\eta_E^+$), as a function of the logarithm to the basis 10 of the Hencky strain $\varepsilon$, log($\varepsilon$), between Hencky strains 1.00 and 3.00 at a at a temperature of 180° C., where a SHI@0.1 s$^{-1}$ is determined with a deformation rate $\dot{\varepsilon}_H$ of 0.10 s$^{-1}$, a SHI@0.3 s$^{-1}$ is determined with a deformation rate $\dot{\varepsilon}_H$ of 0.30 s$^{-1}$, a SHI@1.0 s$^{-1}$ is determined with a deformation rate $\dot{\varepsilon}_H$ of 1.00 s$^{-1}$, a SHI@3 s$^{-1}$ is determined with a deformation rate $\dot{\varepsilon}_H$ of 3.00 s$^{-1}$, and a SHI@10 s$^{-1}$ is determined with a deformation rate $\dot{\varepsilon}_H$ of 10.0 s$^{-1}$. In comparing the strain hardening index (SHI) at those five strain rates $\dot{\varepsilon}_H$ of 0.10, 0.30, 1.00, 3.00 and 10.00 s$^{-1}$, the slope of the strain hardening index (SHI) as a function of the logarithm to the basis 10 of $\dot{\varepsilon}_H$ (log ($\dot{\varepsilon}_H$)) is a characteristic measure for multi-branching. Therefore, a multi-branching index (MBI) is defined as the slope of the strain hardening index (SHI) as a function of log($\dot{\varepsilon}_H$), i.e. the slope of a linear fitting curve of the strain hardening index (SHI) versus log($\dot{\varepsilon}_H$) applying the least square method, preferably the strain hardening index (SHI) is defined at deformation rates 1H between 0.05 s$^{-1}$ and 20.00 s$^{-1}$, more preferably between 0.10 μl and 10.00 s$^{-1}$, still more preferably at the deformations rates 0.10, 0.30, 1.00, 3.00 and 10.00 s$^{-1}$. Yet more preferably the SHI-values determined by the deformations rates 0.10, 0.30, 1.00, 3.00 and 10.00 s$^{-1}$ are used for the linear fit according to the least square method when establishing the multi-branching index (MBI).

Hence, a further preferred requirement of the inventive article is that the composition, which is extrusion coated on the substrate, and/or the polypropylene of said composition has a multi-branching index (MBI) of at least 0.15, more preferably of at least 0.20, and still more preferred of at least 0.25. In a still more preferred embodiment the multi-branching index (MBI) is at least 0.28.

It is in particular preferred that the inventive article comprises a composition being extrusion coated on the substrate, wherein said composition and/or the polypropylene of said composition has (have) a branching index g' of less than 1.00, a strain hardening index (SHI@1 s$^{-1}$) of at least 0.30 and multi-branching index (MBI) of at least 0.15. Still more preferred said composition and/or the polypropylene of said composition has (have) a branching index g' of less than 0.80, a strain hardening index (SHI@1 s$^{-1}$) of at least 0.40 and multi-branching index (MBI) of at least 0.15. In another preferred embodiment said composition and/or the polypropylene of said composition has (have) a branching index g' of less than 1.00, a strain hardening index (SHI@1 s$^{-1}$) of at least 0.30 and multi-branching index (MBI) of at least 0.20. In still another preferred embodiment said composition and/or the polypropylene of said composition has (have) a branching index g' of less than 0.80, a strain hardening index (SHI@1 s$^{-1}$) of at least 0.40 and multi-branching index (MBI) of at least 0.20. In yet another preferred embodiment said composition and/or the polypropylene of said composition has (have) a branching index g' of less than 0.80, a strain hardening index (SHI@1 s$^{-1}$) of at least 0.50 and multi-branching index (MBI) of at least 0.30.

Accordingly, the composition of the inventive article and/or the polypropylenes of said composition is (are) characterized by the fact that their strain hardening index (SHI) increases with the deformation rate $\dot{\varepsilon}_H$, i.e. a phenomenon which is not observed in other compositions being extrusion coated on the substrates. Single branched polymer types (so called Y polymers having a backbone with a single long side-chain and an architecture which resembles a "Y") or H-branched polymer types (two polymer chains coupled with a bridging group and a architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligibly with increase of the deformation rate (dε/dt). Industrial conversion processes which imply elongational flow operate at very fast extension rates. Hence the advantage of a material which shows more pronounced strain hardening (measured by the strain hardening index SHI) at high strain rates becomes obvious. The faster the material is stretched, the higher the strain hardening index (SHI) and hence the more stable the material will be in conversion. Especially in the fast extrusion process, like in the extrusion coating process, the melt of the multi-branched polypropylenes has a high stability. Moreover the inventive articles, i.e. the compositions, which are extrusion coated on the substrates, are characterized by a rather high stiffness in combination with a rather high heat resistance.

Further information concerning the measuring methods applied to obtain the relevant data for the branching index g', the tensile stress growth function $\eta_E^+$, the Hencky strain rate $\dot{\varepsilon}_H$, the Hencky strain $\varepsilon$ and the multi-branching index (MBI) is provided in the example section.

It is in addition preferred that the inventive article, in particular the composition, which is extrusion coated on the substrate, is further characterized by low amounts of extractables. Extractables are undesirable in the field of food packing or in the field of medical packing. However the inventive article shall be preferably used for such applications. Thus it is preferred that the composition, which is extrusion coated on the substrate, according to the first aspect of the present technology has good process properties even though said composition is characterized by rather low amounts of xylene solubles, i.e. by xylene solubles of less than 2.0 wt.-%.

Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas.

However, not only extractables in the article, in particular in the composition which is extrusion coated on the substrate, are detrimental for their use as packing material but also a low heat resistance. Thus in another aspect it is preferred that the article, i.e. the composition extrusion coated on the substrate, is characterized by a high heat resistance.

Accordingly, the article according to the first aspect of the present technology is further defined as follows: The article comprises a substrate, which is extrusion coated with a composition comprising a polypropylene, wherein said polypropylene is produced in the presence of a metallocene catalyst, preferably in the presence of a metallocene catalyst as further defined below, and a) said composition and/or the polypropylene of said composition has (have) Xylene solubles (XS) of less than 2.0 wt.-% and/or, preferably and, b) said composition and/or the polypropylene of said composition fulfils the equation $$\text{Vicat } B \ [^\circ C.] > -3.96 \cdot C_x \ [\text{mol \%}] + 86.85$$

wherein

Vicat B is the heat resistance of the composition or of the polypropylene according to ISO 306 (50 N), and $C_x$ is the comonomer content in said composition or in said polypropylene.

Preferably the article, more preferably the composition of the article, is free of polyethylene, even more preferred the article, in particular the composition, comprises a polypropylene as defined above and further defined below as the only polymer component.

Even more preferred the amount of xylene solubles of the composition, which is extrusion coated on the substrate, and/or of the polypropylene of said composition are less than 2.0 wt.-%, more preferably less than 1.0 wt.-%, and yet more preferably less than 0.80 wt.-%.

The Vicat softening temperature, like Vicat B as used in the above stated formula, shows heat softening characteristics of the compositions and polypropylene, respectively, used for the article. For the measurement a flat specimen is placed in a temperature regulated heating bath, a needle type, loaded penetrator is set on the specimen surface and the bath temperature is raised at a constant rate. The temperature of the bath at which the penetration of the needle has reached a predefined level is the Vicat B softening temperature. The exact measuring method is determined in the example section.

Accordingly the Vicat B temperature is an appropriate parameter to define the article, in particular the composition of the article, which is extrusion coated on the substrate, with regard to its thermal behaviour.

As stated above $C_x$ stands for the comonomers used in the composition and used in the polypropylene, respectively.

Thus $C_x$ can represent any comonomer suitable for the composition or propylene copolymer according to the present technology. In particular $C_x$ represents any comonomers suitable for propylene copolymers, i.e. suitable for propylene copolymers as defined in the instant technology. It is in particular preferred that $C_x$ stands for $C_2$, i.e. for the ethylene content in the composition or in the propylene copolymer, in particular for the propylene copolymer as defined in the instant technology.

As indicated above, according to the first aspect of the present technology the article can be or can be additionally (in addition to the definition by xylene solubles) defined by the heat resistance of its composition and/or of the polypropylene of said composition. However it is preferred that the article comprising a substrate, which is extrusion coated with a composition, is characterized in that a) said composition comprises a propylene homopolymer and wherein said composition and/or said homopolymer has (have) a heat resistance measured according to Vicat B of at least 90° C., still more preferred of at least 95° C., yet more preferred of at least 100° C., and more preferred said composition and/or said homopolymer has (have) in addition xylene solubles (XS) of less than 2.0 wt.-%, more preferred of less than 1.0 wt.-%, and yet more preferred of less than 0.80 wt.-%, or b) said composition comprises a propylene copolymer and wherein said composition and/or said copolymer has (have) a heat resistance measured according to Vicat B of at least 73° C., still more preferred of at least 76° C., yet more preferred of at least 80° C., and more preferred said composition and/or said copolymer has (have) in addition xylene solubles (XS) of less than 2.0 wt.-%, more preferred of less than 1.0 wt.-%, and yet more preferred of less than 0.80 wt.-%.

As stated above, high amounts of extractables are undesired. High amounts of xylene solubles in compositions comprising polypropylene are often caused by rather high amounts of comonomer fractions, in particular by rather high amounts of ethylene. Thus it is preferred that the comonomer content, preferably the ethylene content, in the composition, which is extrusion coated on the substrate, and/or in the polypropylene of said composition does not exceed 10 mol.-%, more preferably does not exceed 8 mol-%. It is in particular preferred that the polypropylene is a propylene homopolymer as defined below.

It is in particular mentioned that the above stated formula $$\text{Vicat } B \ [^\circ C.] > -3.96 \cdot C_x \ [\text{mol \%}] + 86.85$$

is preferably applied for the articles with comonomer contents of not higher than 10 mol.-%, i.e. the comonomer content of the composition of said article and/or of the polypropylene does not exceed 10 mol.-%.

Another source which causes rather high amounts of extractables is the use of plasticizer in the polymer composition. Thus it is preferred that the composition and/or the polypropylene does (do) not comprise any plasticizer in detectable amounts.

In a second embodiment, the present technology is related to an article comprising a substrate which is extrusion coated with a composition comprising a polypropylene, wherein said composition and/or said polypropylene has (have) a strain rate thickening which means that the strain hardening increases with extension rates. A strain hardening index (SHI) can be determined at different strain rates. A strain hardening index (SHI) is defined as the slope of the tensile stress growth function $\eta_E^+$ as a function of the Hencky strain $\epsilon$ on a logarithmic scale between 1.00 and 3.00 at a at a temperature of 180° C., where a SHI@0.1 s$^{-1}$ is determined with a deformation rate $\dot{\epsilon}_H$ of 0.10 s$^{-1}$, a SHI@0.3 s$^{-1}$ is determined with a deformation rate $\dot{\epsilon}_H$ of 0.30 s$^{-1}$, a SHI@1.0 s$^{-1}$ is determined with a deformation rate $\dot{\epsilon}_H$ of 1.00 s$^{-1}$, a SHI@3 s$^{-1}$ is determined with a deformation rate $\dot{\epsilon}_H$ of 3.00 s$^{-1}$, a SHI@10 s$^{-1}$ is determined with a deformation rate $\dot{\epsilon}_H$ of 10.00 s$^{-1}$. In comparing the strain hardening index at those five strain rates $\dot{\epsilon}_H$ of 0.10, 0.30, 1.0, 3.0 and 10.00 s$^{-1}$, the slope of the strain hardening index (SHI) as a function of the logarithm to the basis 10 of $\dot{\epsilon}_H$, log($\dot{\epsilon}_H$), is a characteristic measure for multi-branching. Therefore, a multi-branching index (MBI) is defined as the slope of the strain hardening index (SHI as a function of log($\dot{\epsilon}_H$), i.e. the slope of a linear fitting curve of the strain hardening index (SHI) versus log($\dot{\epsilon}_H$) applying the least square method, preferably the strain hardening index (SHI) is defined at deformation rates $\dot{\epsilon}_H$ between 0.05 s$^{-1}$ and 20.0 s$^{-1}$, more preferably between 0.10 s$^{-1}$ and 10.0 s$^{-1}$, still more preferably at the deformations rates 0.10, 0.30, 1.00, 3.00 and 10.0 s$^{-1}$. Yet more preferably the SHI-values determined by the deformations rates 0.10, 0.30, 1.00, 3.00 and 10.0 s$^{-1}$ are used for the linear fit according to the least square method when establishing the multi-branching index (MBI).

Hence, in the second embodiment the article comprises a substrate which is extrusion coated with a composition comprising a polypropylene, wherein said composition and/or the polypropylene of said composition has (have) a multi-branching index (MBI) of at least 0.15.

Preferably the article, i.e. the composition of the article, is free of polyethylene, even more preferred the article, i.e. the composition of the article, comprises a polypropylene as defined above and further defined below as the only polymer component.

Preferably said polypropylene is produced in the presence of a metallocene catalyst, more preferably in the presence of a metallocene catalyst as further defined below.

Surprisingly, it has been found that articles with such characteristics have superior properties compared to the articles known in the art. Especially, the melt of the composition in the extrusion process has a high stability, i.e. the extrusion line can be operated at a high screw speed. In addition the inventive article, in particular the composition of said article, is characterized by a high heat stability in combination with low levels of extractables.

As stated above, one characteristic of the inventive article is the extensional melt flow properties of the composition and/or the polypropylene component of said composition, which is extrusion coated on the substrate. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

As stated above, the first requirement according to the second embodiment is that the composition of the article and/or the polypropylene of said composition has (have) a multi-branching index (MBI) of at least 0.15, more preferably of at least 0.20, and still more preferred of at least 0.30.

As mentioned above, the multi-branching index (MBI) is defined as the slope of the strain hardening index (SHI) as a function of log(d$\epsilon$/dt) [d SHI/d log(d$\epsilon$/dt)].

Accordingly, the composition and/or the polypropylene of said composition is (are) characterized by the fact that their strain hardening index (SHI) increases with the deformation rate $\dot{\epsilon}_H$, i.e. a phenomenon which is not observed in other polypropylenes. Single branched polymer types (so called Y polymers having a backbone with a single long side-chain and an architecture which resembles a "Y") or H-branched polymer types (two polymer chains coupled with a bridging group and a architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligible with increase of the deformation rate (d$\epsilon$/dt). Industrial conversion processes which imply elongational flow operate at very fast extension rates. Hence the advantage of a material which shows more pronounced strain hardening (measured by the strain hardening index (SHI)) at high strain rates becomes obvious. The faster the material is stretched, the higher the strain hardening index (SHI) and hence the more stable the material will be in conversion. Especially in the fast extrusion process, like in the extrusion coating process, the melt of the multi-branched polypropylenes has a high stability. Moreover the inventive articles, i.e. the compositions, which are extrusion coated on the substrates, are characterized by a rather high stiffness in combination with a rather high heat resistance.

A further preferred requirement is that the strain hardening index (SHI@1 s$^{-1}$) of the composition and/or the polypropylene of said composition shall be at least 0.30, more preferred of at least 0.40, still more preferred of at least 0.50.

The strain hardening index (SHI) is a measure for the strain hardening behavior of the polymer melt, in particular of the polypropylene melt. In the present technology, the strain hardening index (SHI@1 s$^{-1}$) has been measured by a deformation rate (d$\epsilon$/dt) of 1.00 s$^{-1}$ at a temperature of 180° C. for determining the strain hardening behavior, wherein the strain hardening index (SHI) is defined as the slope of the tensile stress growth function $\eta_E^+$ as a function of the Hencky strain $\epsilon$ on a logarithmic scale between 1.00 and 3.00 (see FIG. 1). Thereby the Hencky strain $\epsilon$ is defined by the formula $\epsilon = \dot{\epsilon}_H t$, wherein the Hencky strain rate $\dot{\epsilon}_H$ is defined by the formula $$\dot{\epsilon}_H = \frac{2 \cdot \Omega \cdot R}{L_0} [s^{-1}] \text{ with}$$

"$L_0$" is the fixed, unsupported length of the specimen sample being stretched which is equal to the centerline distance between the master and slave drums, "R" is the radius of the equi-dimensional windup drums, and "$\Omega$" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H \cdot A(\varepsilon)} \text{ with}$$

$$T(\varepsilon) = 2 \cdot R \cdot F(\varepsilon) \text{ and}$$

$$A(\varepsilon) = A_0 \cdot \left(\frac{d_S}{d_M}\right)^{2/3} \cdot \exp(-\varepsilon) \text{ wherein}$$

the Hencky strain rate $\dot{\varepsilon}_H$ is defined as for the Hencky strain $\varepsilon$ "F" is the tangential stretching force
"R" is the radius of the equi-dimensional windup drums
"T" is the measured torque signal, related to the tangential stretching force "F"
"A" is the instantaneous cross-sectional area of a stretched molten specimen
"$A_0$" is the cross-sectional area of the specimen in the solid state (i.e. prior to melting),
"$d_s$" is the solid state density and
"$d_M$" the melt density of the polymer.

In addition, it is preferred that the branching index g' of the polypropylene of the article shall be less than 1.00, more preferably less than 0.90, still more preferably less than 0.80. In the preferred embodiment, the branching index g' shall be less than 0.70. The branching index g' defines the degree of branching and correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference.

When measured on the composition, which is extrusion coated on the substrate, the branching index g' is preferably of less than 1.00, more preferably less than 0.90, still more preferably less than 0.80. In the preferred embodiment, the branching index g' of the composition, which is extrusion coated on the substrate, shall be less than 0.75. In this case of course the whole composition is used for $[IV]_{br}$.

The intrinsic viscosity needed for determining the branching index g' is measured according to DIN ISO 1628/1, October 1999 (in Decalin at 135° C.).

Further information concerning the measuring methods applied to obtain the relevant data for the a multi-branching index (MBI), the tensile stress growth function $\eta_E^+$, the Hencky strain rate $\dot{\varepsilon}_H$, the Hencky strain and the branching index g is provided in the example section.

It is in particular preferred that the inventive article comprises a composition being extrusion coated on the substrate, wherein said composition and/or the polypropylene of said composition has (have) a branching index g' of less than 1.00, a strain hardening index (SHI1 s$^{-1}$) of at least 0.30 and multi-branching index (MBI) of at least 0.15. Still more preferred the said composition and/or the polypropylene of said composition has (have) a branching index g' of less than 0.80, a strain hardening index (SHI@1 s$^{-1}$) of at least 0.40 and multi-branching index (MBI) of at least 0.15. In another preferred embodiment said composition and/or the polypropylene of said composition has (have) a branching index g' of less than 1.00, a strain hardening index (SHI1 s$^{-1}$) of at least 0.30 and multi-branching index (MBI) of at least 020. In still another preferred embodiment said composition and/or the polypropylene of said composition has (have) a branching index g' of less than 0.80, a strain hardening index (SHI@1 s$^{-1}$) of at least 0.40 and multi-branching index (MBI) of at least 0.20. In yet another preferred embodiment said composition and/or the polypropylene of said composition has (have) a branching index g' of less than 0.80, a strain hardening index (SHI@1 s$^{-1}$) of at least 0.50 and multi-branching index (MBI) of at least 030.

It is in addition preferred that the inventive article, in particular the composition, which is extrusion coated on the substrate, is further characterized by low amounts of extractables. Extractables are undesirable in the field of food packing or in the field of medical packing. However the inventive article shall be preferably used for such applications. Thus it is preferred that the composition, which is extrusion coated on the substrate, according to the second aspect of the present technology has good process properties even though said composition is characterized by rather low amounts of xylene solubles, i.e. by xylene solubles of less than 2.0 wt.-%.

Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas.

However, not only extractables in the article, in particular in the composition which is extrusion coated on the substrate, are detrimental for their use as packing material but also a low heat resistance. Thus in another aspect it is preferred that the article, i.e. the composition extrusion coated on the substrate, is characterized by a high heat resistance.

Accordingly, the article according to the second aspect of the present technology is further defined as follows: The article comprises a substrate, which is extrusion coated with a composition comprising a polypropylene, wherein a) said composition and/or the polypropylene of said composition has (have) Xylene solubles (XS) of less than 2.0 wt.-% and/or, preferably and, b) said composition and/or the polypropylene of said composition fulfils the equation Vicat $B$ [° C.]$>-3.96 \cdot C_x$ [mol %]$+86.85$ wherein
Vicat B is the heat resistance of the composition or of the polypropylene according to ISO 306 (50 N), and
$C_x$ is the comonomer content in said composition or in said polypropylene.

Preferably the article, more preferably the composition of the article, is free of polyethylene, even more preferred the article, in particular the composition, comprises a polypropylene as defined above and further defined below as the only polymer component.

Even more preferred is that the amount of xylene solubles of the composition, which is extrusion coated on the substrate, and/or of the polypropylene of said composition is less than 2.0 wt.-%, more preferably less than 1.0 wt.-%, and yet more preferably less than 0.80 wt.-%.

The Vicat softening temperature, like Vicat B as used in the above stated formula, shows heat softening characteristics of the compositions and polypropylene, respectively, used for inventive article. For the measurement a flat specimen is placed in a temperature regulated heating bath, a needle type, loaded penetrator is set on the specimen surface and the bath temperature is raised at a constant rate. The temperature of the bath at which the penetration of the needle has reached a predefined level is the Vicat B softening temperature. The exact measuring method is described in the example section.

Accordingly the Vicat B temperature is an appropriate parameter to define the article, in particular the composition of the article, which is extrusion coated on the substrate, with regard to its thermal behaviour.

As stated above $C_x$ stands for the comonomers used in the composition and used in the polypropylene, respectively. Thus $C_x$ can represent any comonomer suitable for the composition or propylene copolymer according to the present technology. In particular $C_x$ represents any comonomers suitable for propylene copolymers, i.e. suitable for propylene copolymers as defined in the instant technology. It is in particular preferred that $C_x$ stands for $C_2$, i.e. for the ethylene content in the composition or in the propylene copolymer, in particular for the propylene copolymer as defined in the instant technology.

As indicated above, according to the second aspect of the present technology the article can be or can be additionally (in addition to the definition by xylene solubles) defined by the heat resistance of its composition and/or of the polypropylene of said composition. However it is preferred that the article comprising a substrate, which is extrusion coated with a composition, is characterized in that a) said composition comprises a propylene homopolymer and wherein said composition and/or said homopolymer has (have) a heat resistance measured according to Vicat B of at least 90° C., still more preferred of at least 95° C., yet more preferred of at least 100° C., and more preferred said composition and/or said homopolymer has (have) in addition xylene solubles (XS) of less than 2.0 wt.-%, more preferred of less than 1.0 wt.-%, and yet more preferred of less than 0.80 wt.-%, or b) said composition comprises a propylene copolymer and wherein said composition and/or said copolymer has (have) a heat resistance measured according to Vicat B of at least 73° C., still more preferred of at least 76° C., yet more preferred of at least 80° C., and more preferred said composition and/or said copolymer has (have) in addition xylene solubles (XS) of less than 2.0 wt.-%, more preferred of less than 1.0 wt.-%, and yet more preferred of less than 0.80 wt.-%.

As stated above, high amounts of extractables are undesired. High amounts of xylene solubles in compositions comprising polypropylene are often caused by rather high amounts of comonomer fractions, in particular by rather high amounts of ethylene. Thus it is preferred that the comonomer content, preferably the ethylene content, in the composition, which is extrusion coated on the substrate, and/or in the polypropylene of said composition does not exceed 10 mol.-%, more preferably does not exceed 8 mol.-%. It is in particular preferred that the polypropylene is a propylene homopolymer as defined below.

It is in particular mentioned that the above stated formula

Vicat $B$ [° C.]>-3.96·$C_c$ [mol %]+86.85 is preferably applied for the articles with comonomer contents of not higher than 10 mol.-%, i.e. the comonomer content of the composition of said article and/or of the polypropylene does not exceed 10 mol.-%.

Another source which causes rather high amounts of extractables is the use of plasticizer in the polymer composition. Thus it is preferred that the composition and/or the polypropylene does (do) not comprise any plasticizer in detectable amounts.

The third aspect of the present technology is directed to an article comprising a substrate, which is extrusion coated with a composition comprising a polypropylene, wherein the article, in particular the composition of said article is characterized by low amounts of extractables. Extractables are undesirable in the field of food packing or in the field of medical packing. However the inventive article shall be preferably used for such applications. Thus it is preferred that the article according to the third aspect of the present technology has a good process properties even though its composition, which is extrusion coated on the substrate, is characterized by rather low amounts of xylene solubles, i.e. by xylene solubles of less than 2.0 wt.-%.

Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas.

However, not only extractables in the articles, i.e. in the compositions of the articles, are detrimental for their use as packing material but also a low heat resistance. Thus in another aspect it is preferred that the composition of the article is characterized by a high heat resistance.

Accordingly, the article according to the third aspect of the present technology comprises a substrate, which is extrusion coated with a composition comprising a polypropylene, wherein a) said composition and/or the polypropylene of said composition has (have) Xylene solubles (XS) of less than 2.0 wt.-% and/or, preferably and, b) said composition and/or the polypropylene of said composition fulfils the equation Vicat $B$ [° C.]>-3.96·$C_x$ [mol %]+86.85 wherein

Vicat B is the heat resistance of the composition or of the polypropylene according to ISO 306 (50 N), and $C_x$ is the comonomer content in said composition or in said polypropylene.

Preferably the article, more preferably the composition of the article, is free of polyethylene, even more preferred the article, more preferably the composition of the article, comprises a polypropylene as defined above and further defined below as the only polymer component.

Preferably said polypropylene is produced in the presence of a metallocene catalyst, more preferably in the presence of a metallocene catalyst as further defined below.

Surprisingly, it has been found that articles with such characteristics have superior properties compared to the articles known in the art. Especially, the melt of the composition in the extrusion process has a high stability, i.e. the extrusion line can be operated at a high screw speed. In addition the inventive article, in particular the composition, is characterized by high heat stability in combination with low levels of extractables.

Even more preferred is that the amount of xylene solubles of the composition of the article and/or of the polypropylene of said composition is less than 2.0 wt.-%, more preferably less than 1.0 wt.-%, and yet more preferably less than 0.80 wt.-%.

The Vicat softening temperature, like Vicat B as used in the above stated formula, shows heat softening characteristics of the compositions, which are extrusion coated on the substrate, and polypropylene, respectively, used for the article. For the measurement a flat specimen is placed in a temperature regulated heating bath, a needle type, loaded penetrator is set on the specimen surface and the bath temperature is raised at a constant rate. The temperature of the bath at which the penetration of the needle has reached a predefined level is the Vicat B softening temperature. The exact measuring method is determined in the example section.

Accordingly the Vicat B temperature is an appropriate parameter to define the article with regard to its thermal behaviour.

As stated above $C_x$ stands for the comonomers used in the composition and used in the polypropylene, respectively. Thus $C_x$ can represent any comonomer suitable for the composition or propylene copolymer according to the present technology. In particular $C_x$ represents any comonomers suitable for propylene copolymers, i.e. suitable for propylene copolymers as defined in the instant technology. It is in particular preferred that $C_x$ stands for $C_2$, i.e. for the ethylene content in the composition or in the propylene copolymer, in particular for the propylene copolymer as defined in the instant technology.

As indicated above, according to the third aspect of the present technology the article can be or can be additionally (in addition to the definition by xylene solubles) defined by the heat resistance of its composition and/or of the polypropylene of said composition. However it is preferred that the article comprising a substrate, which is extrusion coated with a composition, is characterized in that a) said composition comprises a propylene homopolymer and wherein said composition and/or said homopolymer has (have) a heat resistance measured according to Vicat B of at least 90° C., still more preferred of at least 95° C., yet more preferred of at least 100° C., and more preferred said composition and/or said homopolymer has (have) in addition xylene solubles (XS) of less than 2.0 wt.-%, more preferred of less than 1.0 wt.-%, and yet more preferred of less than 0.80 wt.-%, or b) said composition comprises a propylene copolymer and wherein said composition and/or said copolymer has (have) a heat resistance measured according to Vicat B of at least 73° C., still more preferred of at least 76° C., yet more preferred of at least 80° C., and more preferred said composition and/or said copolymer has (have) in addition xylene solubles (XS) of less than 2.0 wt.-%, more preferred of less than 1.0 wt.-%, and yet more preferred of less than 0.80 wt.-%.

As stated above, high amounts of extractables are undesired. High amounts of xylene solubles in articles, i.e. in compositions extrusion coated on a substrate, comprising polypropylene are often caused by rather high amounts of comonomer fractions, in particular by rather high amounts of ethylene. Thus it is preferred that the comonomer content, preferably the ethylene content, in the composition of the article and/or in the polypropylene of said composition does not exceed 10 mol.-%, more preferably does not exceed 8 mol.-%. It is in particular preferred that the polypropylene is a propylene homopolymer as defined below.

It is in particular mentioned that the above stated formula $$\text{Vicat } B\ [^\circ C.] > -3.96 \cdot C_x\ [\text{mol \%}] + 86.85$$

is preferably applied for the articles with comonomer contents of not higher than 10 mol.-%, i.e. the comonomer content of the composition of said article and/or of the polypropylene does not exceed 10 mol.-%.

Another source which causes rather high amounts of extractables is the use of plasticizer in the polymer composition. Thus it is preferred that the composition and/or the polypropylene does (do) not comprise any plasticizer in detectable amounts.

In addition it is preferred that the composition of the inventive article and/or the polypropylene of said composition has (have) a strain rate thickening which means that the strain hardening increases with extension rates. A strain hardening index (SHI) can be determined at different strain rates. A strain hardening index (SHI) is defined as the slope of the tensile stress growth function $\eta_E^+$ as a function of the Hencky strain $\epsilon$ on a logarithmic scale between 1.00 and 3.00 at a at a temperature of 180° C., where a SHI@0.1 s$^{-1}$ is determined with a deformation rate $\dot{\epsilon}_H$ of 0.10 s$^{-1}$, a SHI@0.3 s$^{-1}$ is determined with a deformation rate $\dot{\epsilon}_H$ of 0.30 s$^{-1}$, a SHI@1.0 s$^{-1}$ is determined with a deformation rate $\dot{\epsilon}_H$ of 1.00 s$^{-1}$, a SHI@3 s$^{-1}$ is determined with a deformation rate $\dot{\epsilon}_H$ of 3.00 s$^{-1}$, a SHI@10 s$^{-1}$ is determined with a deformation rate $\dot{\epsilon}_H$ of 10.0 s$^{-1}$. In comparing the strain hardening index at those five strain rates $\dot{\epsilon}_H$ of 0.10, 0.30, 1.0, 3.0 and 10.00 s$^{-1}$, the slope of the strain hardening index (SHI) as a function of the logarithm to the basis 10 of $\dot{\epsilon}_H$, $\log(\dot{\epsilon}_H)$, is a characteristic measure for multi-branching. Therefore, a multi-branching index (MBI) is defined as the slope of the strain hardening index (SHI as a function of $\log(\dot{\epsilon}_H)$, i.e. the slope of a linear fitting curve of the strain hardening index (SHI) versus $\log(\dot{\epsilon}_H)$ applying the least square method, preferably the strain hardening index (SHI) is defined at deformation rates $\dot{\epsilon}_H$ between 0.05 s$^{-1}$ and 20.0 s$^{-1}$, more preferably between 0.10 s$^{-1}$ and 10.0 s$^{-1}$, still more preferably at the deformations rates 0.10, 0.30, 1.00, 3.00 and 10.00 s$^{-1}$. Yet more preferably the SHI-values determined by the deformations rates 0.10, 0.30, 1.00, 3.00 and 10.00 s$^{-1}$ are used for the linear fit according to the least square method when establishing the multi-branching index (MBI).

Hence, it is preferred that the composition, which is extrusion coated on the substrate, and/or the polypropylene of said composition has (have) a multi-branching index (MBI) of at least 0.15, more preferably of at least 0.20, and still more preferred of at least 0.30.

Hence, the composition of the article, i.e. the composition which is extrusion coated on the substrate, and/or the polypropylene component of said composition is (are) characterized in particular by extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

As mentioned above, the multi-branching index (MBI) is defined as the slope of the strain hardening index (SHI) as a function of $\log(d\epsilon/dt)$ [d SHI/d $\log(d\epsilon/dt)$].

Accordingly, the composition of the article and/or the polypropylene of said composition is (are) preferably characterized by the fact that their strain hardening index (SHI) increases with the deformation rate H, i.e. a phenomenon which is not observed in other polypropylenes. Single branched polymer types (so called Y polymers having a backbone with a single long side-chain and an architecture which resembles a "Y") or H-branched polymer types (two polymer chains coupled with a bridging group and a architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligibly with increase of the deformation rate (dε/dt). Industrial conversion processes which imply elongational flow operate at very fast extension rates. Hence the advantage of a material which shows more pronounced strain hardening (measured by the strain hardening index (SHI)) at high strain rates becomes obvious. The faster the material is stretched, the higher the strain hardening index (SHI) and hence the more stable the material will be in conversion. Especially in the fast extrusion process, like in the extrusion coating process, the melt of the multi-branched polypropylenes has a high stability. Moreover the compositions extrusion coated on the substrates are characterized by a rather high stiffness in combination with a high heat resistance.

A further preferred requirement is that the strain hardening index (SHI@1 s$^{-1}$) of the composition of the article, i.e. the composition which is extrusion coated on the substrate, and/or the polypropylene of said composition shall be at least 0.30, more preferred of at least 0.40, still more preferred of at least 0.50.

The strain hardening index (SHI) is a measure for the strain hardening behavior of the polymer melt, in particular of the polypropylene melt. In the present technology, the strain hardening index (SHI@1 s$^{-1}$) has been measured by a deformation rate (dε/dt) of $1.00$ s$^{-1}$ at a temperature of 180° C. for determining the strain hardening behavior, wherein the strain hardening index (SHI) is defined as the slope of the tensile stress growth function $\eta_E^+$ as a function of the Hencky strain ε on a logarithmic scale between 1.00 and 3.00 (see FIG. 1). Thereby the Hencky strain ε is defined by the formula $\varepsilon=\dot{\varepsilon}_H \cdot t$, wherein the Hencky strain rate $\dot{\varepsilon}_H$ is defined by the formula $$\dot{\varepsilon}_H = \frac{2 \cdot \Omega \cdot R}{L_0}[s^{-1}] \text{ with}$$

"$L_0$" is the fixed, unsupported length of the specimen sample being stretched which is equal to the centerline distance between the master and slave drums, "R" is the radius of the equi-dimensional windup drums, and "Ω" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H \cdot A(\varepsilon)} \text{ with}$$

$$T(\varepsilon) = 2 \cdot R \cdot F(\varepsilon) \text{ and}$$

$$A(\varepsilon) = A_0 \cdot \left(\frac{d_S}{d_M}\right)^{2/3} \cdot \exp(-\varepsilon) \text{ wherein}$$

the Hencky strain rate $\dot{\varepsilon}_H$ is defined as for the Hencky strain ε

"F" is the tangential stretching force

"R" is the radius of the equi-dimensional windup drums

"T" is the measured torque signal, related to the tangential stretching force "F"

"A" is the instantaneous cross-sectional area of a stretched molten specimen

"$A_0$" is the cross-sectional area of the specimen in the solid state (i.e. prior to melting), "$d_s$" is the solid state density and "$d_M$" the melt density of the polymer.

In addition, it is preferred that the branching index g' of the polypropylene of the composition which is extrusion coated on the substrate shall be less than 1.00, more preferably less than 0.90, still more preferably less than 0.80. In the preferred embodiment, the branching index g' shall be less than 0.70. The branching index g' defines the degree of branching and correlates with the amount of branches of a polymer. The branching index g' is defined as g'=[IV]$_{br}$/[IV]$_{lin}$ in which g' is the branching index, [IV]$_{br}$ is the intrinsic viscosity of the branched polypropylene and [IV]$_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith incorporated by reference.

When measured on the composition, which is extrusion coated on the substrate, the branching index g' is preferably of less than 1.00, more preferably less than 0.90, still more preferably less than 0.80. In the preferred embodiment, the branching index g' of the composition, which is extrusion coated on the substrate, shall be less than 0.75. In this case of course the whole composition, which is extrusion coated on the substrate, is used for [IV]$_{br}$].

The intrinsic viscosity needed for determining the branching index g' is measured according to DIN ISO 1628/1, October 1999 (in Decalin at 135° C.).

Further information concerning the measuring methods applied to obtain the relevant data for the multi-branching index (MBI), the tensile stress growth function $\eta_E^+$, the Hencky strain rate $\dot{\varepsilon}_H$, the Hencky strain ε and the branching index g' is provided in the example section.

It is in particular preferred that the composition, which is extrusion coated on the substrate, and/or the polypropylene of said composition has (have) a branching index g' of less than 1.00, a strain hardening index (SHI@1 s$^{-1}$) of at least 0.30 and multi-branching index (MBI) of at least 0.15. Still more preferred the composition, which is extrusion coated on the substrate, and/or the polypropylene of said composition has (have) a branching index g' of less than 0.80, a strain hardening index (SHI@1 s$^{-1}$) of at least 0.40 and multi-branching index (MBI) of at least 0.15. In another preferred embodiment the composition, which is extrusion coated on the substrate, and/or the polypropylene of said composition has (have) a branching index g' of less than 1.00, a strain hardening index (SHI@1 s$^{-1}$) of at least 0.30 and multi-branching index (MBI) of at least 020. In still another preferred embodiment the composition, which is extrusion coated on the substrate, and/or the polypropylene of said composition has (have) a branching index g' of less than 0.80, a strain hardening index (SHI@1 s$^{-1}$) of at least 0.40 and multi-branching index (MBI) of at least 020. In yet another preferred embodiment the composition, which is extrusion coated on the substrate, and/or the polypropylene of said composition has (have) a branching index g' of less than 0.80, a strain hardening index (SHI@1 s$^{-1}$) of at least 0.50 and multi-branching index (MBI) of at least 0.30.

Moreover, the tensile modulus of the composition of the article, i.e. the composition which is extrusion coated on the substrate, itself shall be rather high. Thus it is preferred that the tensile modulus of the composition based on a propylene homopolymer shall be at least 720 MPa, more preferably at least 740 MPa.

The further features mentioned below apply to all embodiments described above, i.e. the first, the second and the third embodiment as defined above.

Preferably the polypropylene used for the composition which is extrusion coated on the substrate and/or the polypropylene comprised therein shall be not cross-linked as it is commonly done to improve the process properties of the polypropylene. However the cross-linking is detrimental in many aspects. Inter alia the manufacture of said products is difficult to obtain.

Moreover it is preferred, that article according to the instant technology is further characterized in that the composition extrusion coated on the substrate has only gels with a diameter of equal or less than 500 µm, i.e. no gels with a diameter of more than 500 µm are present in said composition, and wherein said gels are not more than 100 gels per square meter (sqm), more preferably not more than 80 gels per square meter (sqm), and yet more preferably not more than 60 gels per square meter (sqm). In yet another preferred embodiment the composition extrusion coated on the substrate has only gels with a diameter of equal or less than 400 µm, i.e. no gels with a diameter of more than 500 µm are present in said composition, and wherein said gels are not more than 100 gels per square meter (sqm), more preferably not more than 80 gels per square meter (sqm), and yet more preferably not more than 60 gels per square meter (sqm). In still yet another preferred embodiment the composition extrusion coated on the substrate has only gels with a diameter of equal or less than 300 µm, i.e. no gels with a diameter of more than 500 µm are present in said composition, and wherein said gels are not more than 100 gels per square meter (sqm), more preferably not more than 80 gels per square meter (sqm), and yet more preferably not more than 60 gels per square meter (sqm).

Furthermore, it is preferred that the polypropylene has a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as MFR$_2$. Accordingly, it is preferred that in the present technology the polypropylene has an MFR$_2$ in a range of 0.01 to 1000.00 g/10 min, more preferably of 0.01 to 100.00 g/10 min, still more preferred of 0.05 to 50 g/10 min. In a preferred embodiment, the MFR is in a range of 1.00 to 11.00 g/10 min. In another preferred embodiment, the MFR is in a range of 3.00 to 11.00 g/10 min.

The number average molecular weight (Mn) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight (Mw) is the first moment of a plot of the weight of polymer in each molecular weight range against molecular weight.

The number average molecular weight (Mn) and the weight average molecular weight (Mw) as well as the molecular weight distribution are determined by size exclusion chromatography (SEC) using Waters Alliance GPCV 2000 instrument with online viscometer. The oven temperature is 140° C. Trichlorobenzene is used as a solvent.

It is preferred that the polypropylene has a weight average molecular weight (Mw) from 10,000 to 2,000,000 g/mol, more preferably from 20,000 to 1,500,000 g/mol.

More preferably, the polypropylene of the instant technology is isotactic. Thus the polypropylene according to the present technology shall have a rather high pentade concentration, i.e. higher than 90%, more preferably higher than 92% and most preferably higher than 93%. In another preferred embodiment the pentade concentration is higher than 95%. The pentade concentration is an indicator for the narrowness in the stereoregularity distribution of the polypropylene.

In addition, it is preferred that the polypropylene has a melting temperature Tm of higher than 120° C. It is in particular preferred that the melting temperature is higher than 120° C. if the polypropylene is a polypropylene copolymer as defined below. In turn, in case the polypropylene is a polypropylene homopolymer as defined below, it is preferred, that polypropylene has a melting temperature of higher than 150° C., more preferred higher than 155° C.

Not only the polypropylene of the composition, but also the composition itself shall preferably not exceed a specific temperature. Hence it is preferred that the composition of the inventive article, i.e. the composition which is extrusion coated on the substrate, has a melting temperature Tm of higher than 120° C. It is in particular preferred that the melting temperature is higher than 150° C., more preferred higher than 155° C.

In a preferred embodiment the polypropylene as defined above (and further defined below) is preferably unimodal. In another preferred embodiment the polypropylene as defined above (and further defined below) is preferably multimodal, more preferably bimodal.

"Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

In case the polypropylene of the inventive article is not unimodal it is preferably bimodal.

The polypropylene according to the present technology can be homopolymer or a copolymer. Accordingly, the homopolymer as well as the copolymer can be a multimodal polymer composition.

The expression homopolymer used herein relates to a polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be determined with FT infrared spectroscopy, as described below in the examples.

In case the polypropylene according to the present technology is a propylene copolymer, it is preferred that the comonomer is ethylene. However, also other comonomers known in the art are suitable. Preferably, the total amount of comonomer, more preferably ethylene, in the propylene copolymer is up to 15 wt %, more preferably up to 10 wt %.

In a preferred embodiment, the polypropylene is a propylene copolymer comprising a polypropylene matrix and an ethylene-propylene rubber (EPR).

The polypropylene matrix can be a homopolymer or a copolymer, more preferably multimodal, i.e. bimodal, homopolymer or a multimodal, i.e. bimodal, copolymer. In case the polypropylene matrix is a propylene copolymer, then it is preferred that the comonomer is ethylene or butene. However, also other comonomers known in the art are suitable. The preferred amount of comonomer, more preferably ethylene, in the polypropylene matrix is up to 8.00 Mol %. In case the propylene copolymer matrix has ethylene as the comonomer component, it is in particular preferred that the amount of ethylene in the matrix is up to 8.00 Mol %, more preferably less than 6.00 Mol %. In case the propylene copolymer matrix has butene as the comonomer component, it is in particular preferred that the amount of butene in the matrix is up to 6.00 Mol %, more preferably less than 4.00 Mol %.

Preferably, the ethylene-propylene rubber (EPR) in the total propylene copolymer is up to 80 wt %. More preferably the amount of ethylene-propylene rubber (EPR) in the total propylene copolymer is in the range of 20 to 80 wt %, still more preferably in the range of 30 to 60 wt %.

In addition, it is preferred that the polypropylene being a copolymer comprising a polypropylene matrix and an ethylene-propylene rubber (EPR) has an ethylene-propylene rubber (EPR) with an ethylene-content of up to 50 wt %.

In addition, it is preferred that the polypropylene as defined above is produced in the presence of the catalyst as defined below. Furthermore, for the production of the polypropylene of the inventive article as defined above, the process as stated below is preferably used.

Preferably a metallocene catalyst is used for the polypropylene of the composition, which is extrusion coated on the substrate.

Even more preferred, the polypropylene according to the present technology is obtainable by a new catalyst system. This new catalyst system comprises an asymmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is not detectable when determined with the method applied according to DIN 66135 ($N_2$).

An asymmetric catalyst according to the present technology is a metallocene compound comprising at least two organic ligands which differ in their chemical structure. More preferably the asymmetric catalyst according to the present technology is a metallocene compound comprising at least two organic ligands which differ in their chemical structure and the metallocene compound is free of $C_2$-symmetry and/or any higher symmetry. Preferably the asymetric metallocene compound comprises only two different organic ligands, still more preferably comprises only two organic ligands which are different and linked via a bridge.

Said asymmetric catalyst is preferably a single site catalyst (SSC).

Due to the use of the catalyst system with a very low porosity comprising an asymmetric catalyst the manufacture of the above defined multi-branched polypropylene is possible.

Furthermore it is preferred that the catalyst system has a surface area of less than 25 $m^2/g$, yet more preferred less than 20 $m^2/g$, still more preferred less than 15 $m^2/g$, yet still less than 10 $m^2/g$ and most preferred less than 5 $m^2/g$. The surface area according to the present technology is measured according to ISO 9277 ($N_2$).

It is in particular preferred that the catalytic system according to the present technology comprises an asymmetric catalyst, i.e. a catalyst as defined below, and has porosity not detectable when applying the method according to DIN 66135 ($N_2$) and has a surface area measured according to ISO 9277 ($N_2$) less than 5 $m^2/g$.

Preferably the asymmetric catalyst compound, i.e. the asymetric metallocene, has the formula (I):

$$(Cp)_2R_zMX_2 \qquad (I)$$

wherein z is 0 or 1,

M is Zr, Hf or Ti, more preferably Zr, and

X is independently a monovalent anionic ligand, such as σ-ligand

R is a bridging group linking the two Cp ligands

Cp is an organic ligand selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands are selected from the above stated group and both Cp-ligands have a different chemical structure.

The term "σ-ligand" is understood in the whole description in a known manner, i.e. a group bonded to the metal at one or more places via a sigma bond. A preferred monovalent anionic ligand is halogen, in particular chlorine (Cl).

Preferably, the asymmetric catalyst is of formula (I) indicated above, wherein

M is Zr and each X is Cl.

Preferably both identical Cp-ligands are substituted.

Preferably both Cp-ligands have different residues to obtain an asymmetric structure.

Preferably, both Cp-ligands are selected from the group consisting of substituted cyclopenadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopenadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR$_{13}$, —OSiR$_{13}$, —SR", —PR$_{12}$ and —NR$_{12}$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such a manner that both Cp-ligands are of different chemical structure, i.e. both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at the 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at the 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at the 2-position, a substituent and at the six membered ring of the indenyl moiety, more preferably at the 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings.

Concerning the moiety "R" it is preferred that "R" has the formula (II)

$$—Y(R')_2- \qquad (II)$$

wherein

Y is C, Si or Ge, and

R' is $C_1$ to $C_{20}$ alkyl, $C_6$-$C_{12}$ aryl, or $C_7$-$C_{12}$ arylalkyl or trimethylsilyl.

In case both Cp-ligands of the asymmetric catalyst as defined above, in particular case of two indenyl moieties, are linked with a bridge member R, the bridge member R is typically placed at the 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. trimethylsilyl, $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$—, —Si(phenyl)$_2$- or —Si($C_1$-$C_6$ alkyl)(phenyl)-, such as —Si(Me)$_2$—.

In a preferred embodiment the asymmetric catalyst, i.e. the asymetric metallocene, is defined by the formula (III)

$$(Cp)_2R_1ZrCl_2 \qquad (III)$$

wherein both Cp coordinate to M and are selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands are of different chemical structure, and R is a bridging group linking two ligands Cp, wherein R is defined by the formula (II)

$$—Y(R')_2- \qquad (II)$$

wherein

Y is C, Si or Ge, and

R' is $C_1$ to $C_{20}$ alkyl, $C_6$-$C_{12}$ aryl, or $C_7$-$C_{12}$ arylalkyl.

More preferably the asymmetric catalyst is defined by the formula (III), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (III), wherein both Cp are selected from the group consisting of substituted cyclopenadienyl, substituted indenyl, substituted tetrahydroindenyl, and substituted fluorenyl with the proviso that both Cp-ligands differ in the substituents, i.e. the substituents as defined above, bonded to cyclopenadienyl, indenyl, tetrahydroindenyl, or fluorenyl.

Still more preferably the asymmetric catalyst is defined by the formula (III), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl [(2-methyl-(4'-tert.butyl)-4-phenyl-indenyl)(2-isopropyl-(4'-tert.butyl)-4-phenyl-indenyl)]zirconium dichloride (IUPAC: dimethylsilandiyl [(2-methyl-(4'-tert.butyl)-4-phenyl-indenyl)(2-isopropyl-(4'-tert.butyl)-4-phenyl-indenyl)]zirconium dichloride). More preferred said asymmetric catalyst is not silica supported.

The above described asymmetric catalyst components are prepared according to the methods described in WO 01/48034.

It is in particular preferred that the asymmetric catalyst system is obtained by the emulsion solidification technology as described in WO 03/051934. This document is herewith incorporated in its entirety by reference. Hence the asymmetric catalyst is preferably in the form of solid catalyst particles, obtainable by a process comprising the steps of a) preparing a solution of one or more asymmetric catalyst components;

b) dispersing said solution in a solvent immiscible therewith to form an emulsion in which said one or more catalyst components are present in the droplets of the dispersed phase, c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion is subjected to a gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m$^2$/g, still more preferably less than 20 m$^2$/g, yet more preferably less than 15 m$^2$/g, yet still more preferably less than 10 m$^2$/g and most preferably less than 5 m$^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

As mentioned above the catalyst system may further comprise an activator as a cocatalyst, as described in WO 03/051934, which is incorporated herein with by reference.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described, for example, in WO 94/28034 which is incorporated herein by reference. These are linear or cyclic oligomers having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10,000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the present technology is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present technology is related to the use of the above-defined catalyst system for the production of polymers, in particular of a polypropylene according to the present technology.

In addition, the present technology is related to the process for producing the inventive polypropylene, whereby the catalyst system as defined above is employed. Furthermore it is preferred that the process temperature is higher than 60° C. Preferably, the process is a multi-stage process to obtain multimodal polypropylene as defined above.

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene according to the present technology is produced preferably in a multi-stage process in a multi-stage reaction sequence as described in WO 92/12182. The contents of this document are incorporated herein by reference.

It has previously been known to produce multimodal, in particular bimodal, polypropylene in two or more reactors connected in series, i.e. in different steps (a) and (b).

According to the present technology, the main polymerization stages are preferably carried out as a combination of a bulk polymerization/gas phase polymerization.

The bulk polymerizations are preferably performed in a so-called loop reactor.

In order to produce the multimodal polypropylene according to the present technology, a flexible mode is preferred. For this reason, it is preferred that the composition be produced in two main polymerization stages in combination of loop reactor/gas phase reactor.

Optionally, and preferably, the process may also comprise a prepolymerization step in a manner known in the field and which may precede the polymerization step (a).

If desired, a further elastomeric comonomer component, so called ethylene-propylene rubber (EPR) component as defined in the present technology, may be incorporated into the obtained propylene polymer to form a propylene copolymer as defined above. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the propylene polymer as defined above the conditions for the bulk reactor of step (a) may be as follows:

the temperature is within the range of 40° C. to 110° C., preferably between 60° C. and 100° C., 70 to 90° C., the pressure is within the range of 20 bar to 80 bar, preferably between 30 bar to 60 bar, hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The residence time can vary in both reactor zones. In one embodiment of the process for producing the propylene polymer the residence time in the bulk reactor, e.g. loop is in the range 0.5 to 5 hours, e.g. 0.5 to 2 hours and the residence time in the gas phase reactor will generally be 1 to 8 hours.

If desired, the polymerization may be effected in a known manner under supercritical conditions in the bulk, preferably loop reactor, and/or as a condensed mode in the gas phase reactor.

The process of the present technology or any embodiments thereof above enable highly feasible means for producing and further tailoring the propylene polymer composition within the present technology, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made propylene polymer as defined above.

More over the present technology is related to the manufacture of the article by conventional extrusion coating of the composition and/or the polypropylene as defined herein.

The extrusion coating process may be carried out using conventional extrusion coating techniques. Hence, the polymer obtained from the above defined polymerization process is fed, typically in the form of pellets, optionally containing additives, to an extruding device. From the extruder the polymer melt is passed preferably through a flat die to the substrate to be coated. Due to the distance between the die lip and the nip, the molten plastic is oxidized in the air for a short period, usually leading to an improved adhesion between the coating and the substrate. The coated substrate is cooled on a chill roll, after which it is passed to edge trimmers and wound up. The width of the line may vary between, for example, 500 to 1500 mm, e.g. 800 to 1100 mm, with a line speed of up to 1000 m/min, for instance 300 to 800 m/min. The temperature of the polymer melt is typically between 275 and 330° C. The polypropylene of the present technology can be extruded onto the substrate as a monolayer coating or as one layer in a coextrusion. In either of these cases it is possible to use the polypropylene as such or to blend the polypropylene with other polymers. Blending can occur in a post reactor treatment or just prior to the extrusion in the coating process. However it is preferred that only the polypropylene as defined in the present technology is extrusion coated. In a multilayer extrusion coating, the other layers may comprise any polymer resin having the desired properties and processability. Examples of such polymers include: barrier layer PA (polyamide) and EVA; polar copolymers of ethylene, such as copolymers of ethylene and vinyl alcohol or copolymers of ethylene and an acrylate monomer; adhesive layers, e.g. ionomers, copolymers of ethylene and ethyl acrylate, etc; HDPE for stiffness; LDPE resins produced in a high-pressure process; LLDPE resins produced by polymerising ethylene and alpha-olefin comonomers in the presence of a Ziegler, chromium or metallocene catalyst; and MDPE resins.

Thus the present technology is preferably related to articles comprising a substrate and at least one layer of the composition extrusion coated on said substrate as defined in the present technology.

In another aspect the present technology is directed to articles comprising a substrate and more than one layer, i.e. two or three layers, wherein at least one layer is (are) a composition and/or a polypropylene as defined in the present technology.

Furthermore the present technology is also directed to the use of the inventive article as packaging material, in particular as a packaging material for food and/or medical products.

In a further aspect the present technology is directed to the use of the inventive polypropylene as defined herein for extrusion coating and/or for articles comprising at least one layer comprising said polypropylene.

In the following, the present technology is described by way of examples.

EXAMPLES

1. Definitions/Measuring Methods

The following definitions of terms and determination methods apply for the above general description of the present technology as well as to the below examples unless otherwise defined.

A. Pentad Concentration

For the meso pentad concentration analysis, also referred herein as pentad concentration analysis, the assignment analysis is undertaken according to T Hayashi, Pentad concentration, R. Chujo and T. Asakura, Polymer 29 138-43 (1988) and Chujo R, et al., Polymer 35 339 (1994)

B. Multi-Branching Index

1. Acquiring the Experimental Data

Polymer is melted at T=180° C. and stretched with the SER Universal Testing Platform as described below at deformation rates of dε/dt=0.1 0.3 1.0 3.0 and 10 s$^{-1}$ in subsequent experiments. The method to acquire the raw data is described in Sentmanat et al., J. Rheol. 2005, Measuring the Transient Elongational Rheology of Polyethylene Melts Using the SER Universal Testing Platform.

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature. From such prepared plate of 0.7 mm thickness, stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device is less than a threshold of 5×10$^{-3}$ mNm (Milli-Newtonmeter) which is required for precise and correct measurements, the following check procedure is performed prior to each measurement:

The device is set to test temperature (180° C.) for minimum 20 minutes without sample in presence of the clamps A standard test with 0.3 s-1 is performed with the device on test temperature (180° C.)

The torque (measured in mNm) is recorded and plotted against time

The torque must not exceed a value of 5×10$^{-3}$ mNm to make sure that the friction of the device is in an acceptably low range Conducting the Experiment The device is heated for min. 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes+/−20 seconds before the experiment is started.

During the stretching experiment under inert atmosphere (nitrogen) at constant Hencky strain rate, the torque is recorded as a function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed hereby, the transient elongational viscosity calculates from the recorded torque as outlined below.

2. Evaluation

For each of the different strain rates dε/dt applied, the resulting tensile stress growth function $\eta_E^+(d\epsilon/dt, t)$ is plotted against the total Hencky strain ε to determine the strain hardening behaviour of the melt, see FIG. 1.

In the range of Hencky strains between 1.0 and 3.0, the tensile stress growth function $\eta_E^+$ can be well fitted with a function $$\eta_E^+(\dot\epsilon,\epsilon) = c_1 \cdot \epsilon^{c_2}$$

where $c_1$ and $c_2$ are fitting variables. Such derived $c_2$ is a measure for the strain hardening behavior of the melt and called Strain Hardening Index SHI.

Dependent on the polymer architecture, SHI can be independent of the strain rate (linear materials, Y- or H-structures)

increase with strain rate (short chain-, hyperbranched- or multi-branched structures).

Figure 2:
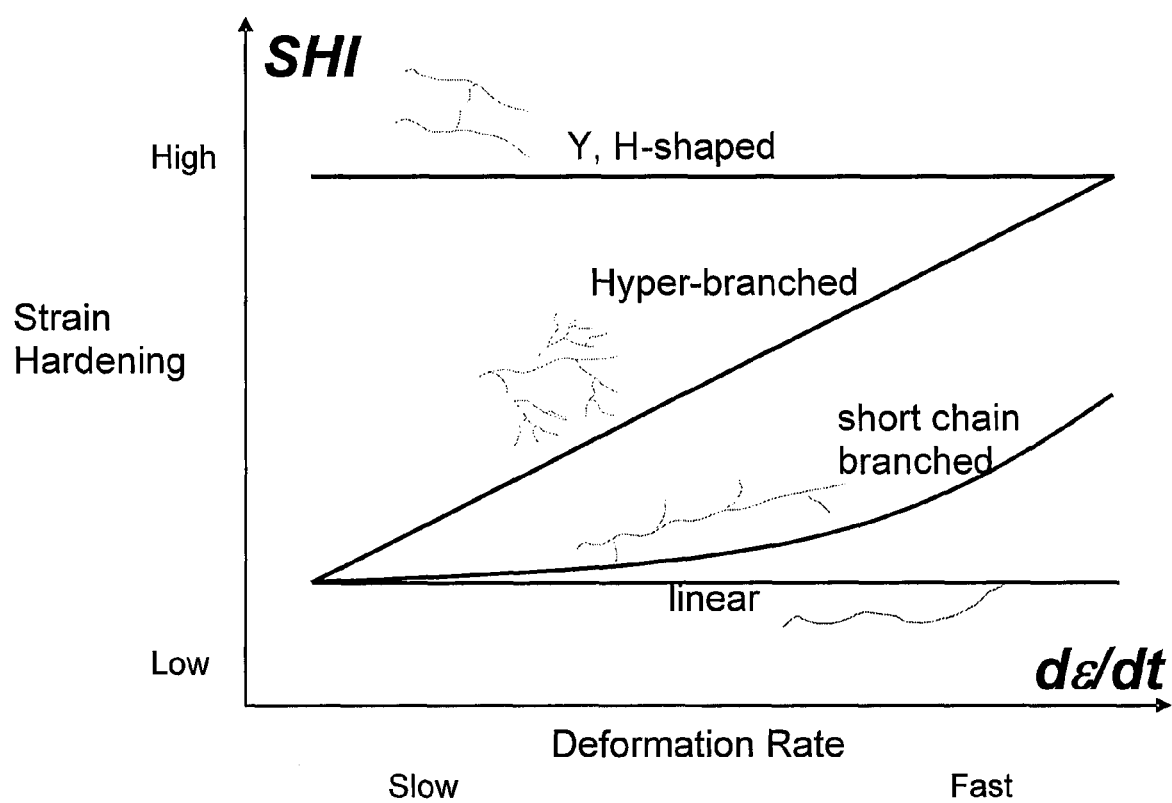
FIG. 2 is a graph depicting the deformation rate versus strain hardening.
Figure 3:
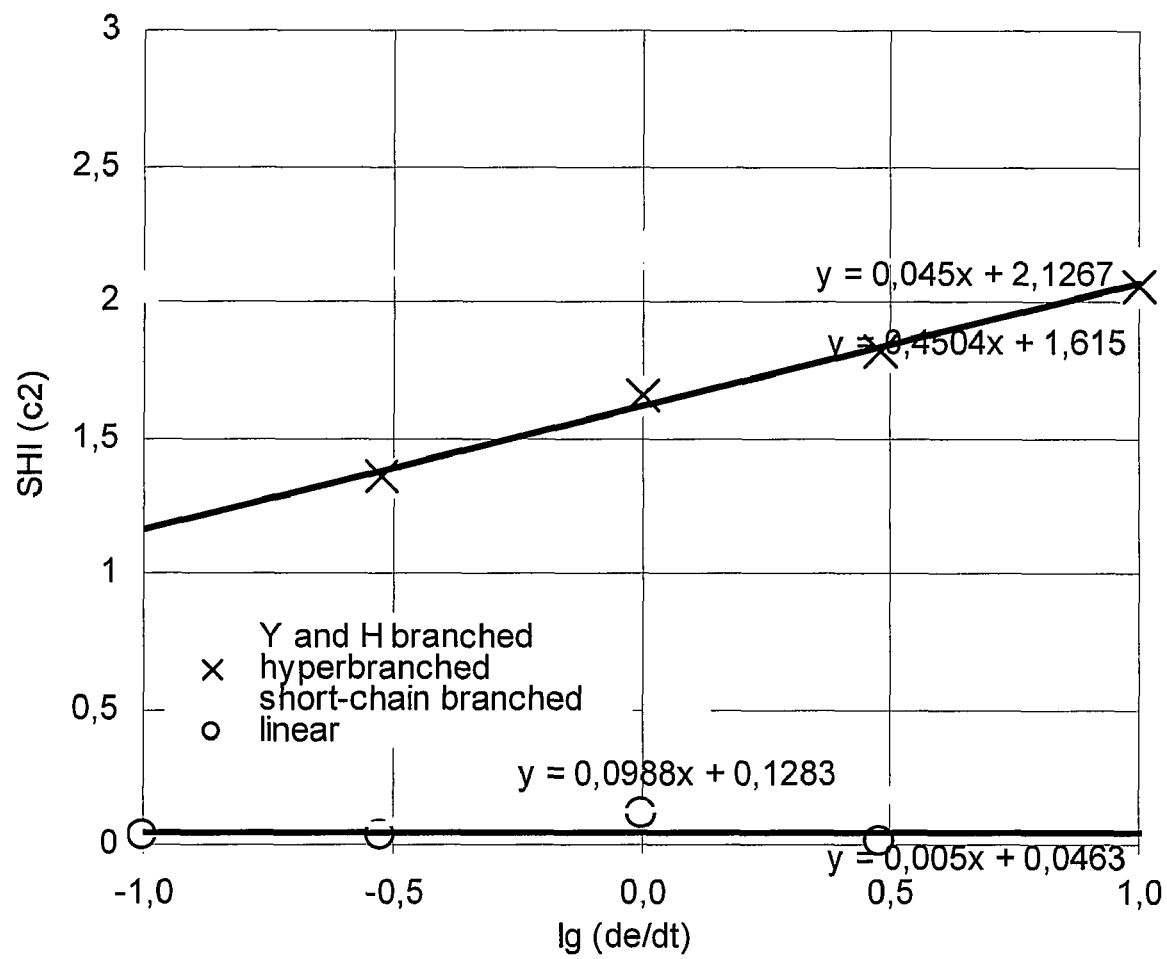
FIG. 3 is a graph depicting the deformation rate versus strain hardening for various examples.
Figure 4:
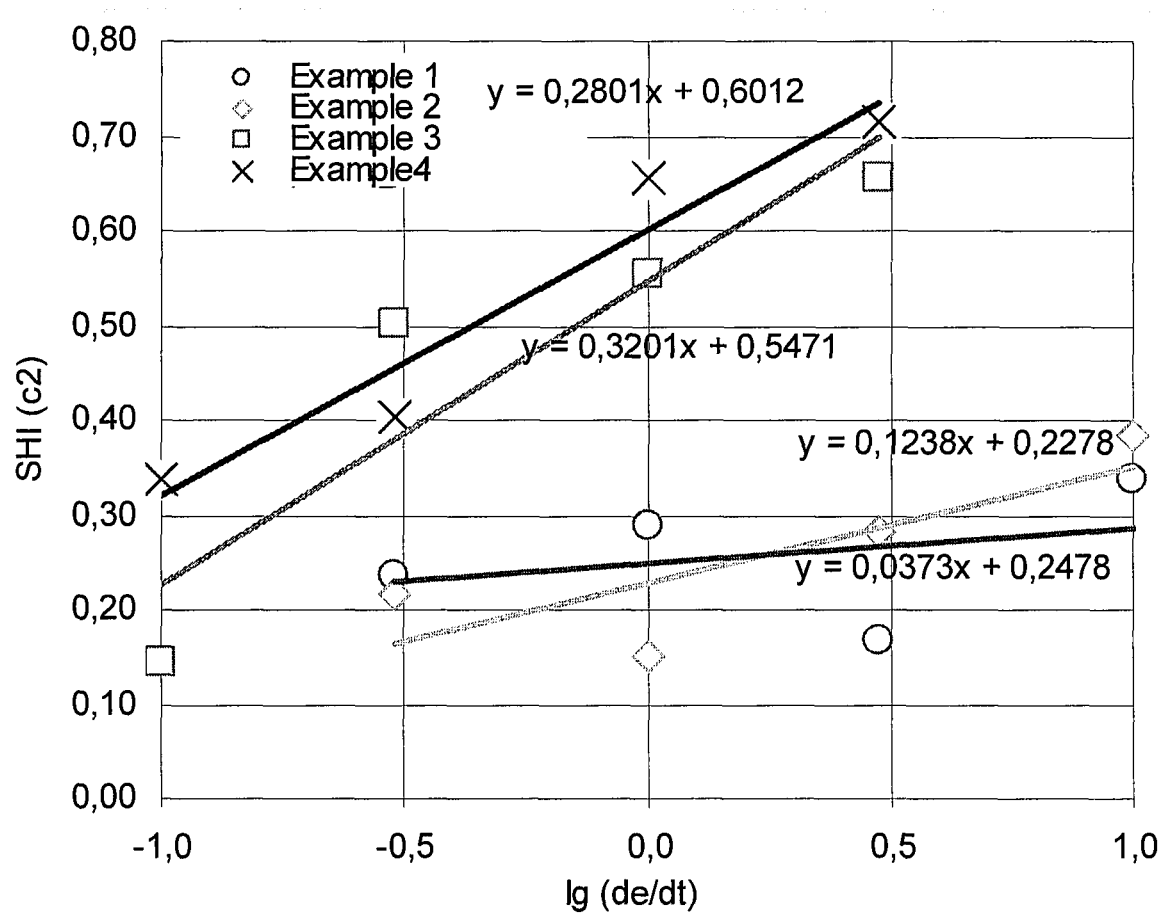
FIG. 4 is a graph depicting the deformation rate versus strain hardening for various examples.

This is illustrated in FIG. 2.

For polyethylene, linear (HDPE), short-chain branched (LLDPE) and hyperbranched structures (LDPE) are well known and hence they are used to illustrate the structural analytics based on the results on extensional viscosity. They are compared with a polypropylene with Y and H-structures with regard to their change of the strain-hardening behavior as a function of strain rate, see FIG. 2 and Table 1.

To illustrate the determination of SHI at different strain rates as well as the multi-branching index (MBI) four polymers of known chain architecture are examined with the analytical procedure described above.

The first polymer is a H- and Y-shaped polypropylene homopolymer made according to EP 879 830 ("A") example 1 through adjusting the MFR with the amount of butadiene. It has a MFR230/2.16 of 2.0 g/10 min, a tensile modulus of 1950 MPa and a branching index g' of 0.7.

The second polymer is a commercial hyperbranched LDPE, Borealis "B", made in a high pressure process known in the art. It has a MFR190/2.16 of 4.5 and a density of 923 kg/m$^3$.

The third polymer is a short chain branched LLDPE, Borealis "C", made in a low pressure process known in the art. It has a MFR190/2.16 of 1.2 and a density of 919 kg/m$^3$.

The fourth polymer is a linear HDPE, Borealis "D", made in a low pressure process known in the art. It has a MFR190/2.16 of 4.0 and a density of 954 kg/m$^3$.

The four materials of known chain architecture are investigated by means of measurement of the transient elongational viscosity at 180° C. at strain rates of 0.10, 0.30, 1.0, 3.0 and 10 s$^{-1}$. Obtained data (transient elongational viscosity versus Hencky strain) is fitted with a function $$\eta_E^+ = c_1 * \epsilon^{c_2}$$

for each of the mentioned strain rates. The parameters c1 and c2 are found through plotting the logarithm of the transient elongational viscosity against the logarithm of the Hencky strain and performing a linear fit of this data applying the least square method. The parameter c1 calculates from the intercept of the linear fit of the data log($\eta_E^+$) versus log(ε) from $$c_1 = 10^{Intercept}$$

and $c_2$ is the strain hardening index (SHI) at the particular strain rate.

This procedure is done for all five strain rates and hence, SHI@0.1 s$^{-1}$, SHI@0.3 s$^{-1}$, SHI@1.0 s$^{-1}$, SHI@3.0 s$^{-1}$, SHI@10 s$^{-1}$ are determined, see FIG. 1.

TABLE 1

SHI-values

| dἐ/dt | log(dἐ/dt) | Property | Y and H branched PP A | Hyper-branched LDPE B | Short-chain branched LLDPE C | Linear HDPE D |
|---|---|---|---|---|---|---|
| 0.1 | −1.0 | SHI@0.1 s$^{-1}$ | 2.05 | — | 0.03 | 0.03 |
| 0.3 | −0.5 | SHI@0.3 s$^{-1}$ | — | 1.36 | 0.08 | 0.03 |
| 1 | 0.0 | SHI@1.0 s$^{-1}$ | 2.19 | 1.65 | 0.12 | 0.11 |
| 3 | 0.5 | SHI@3.0 s$^{-1}$ | — | 1.82 | 0.18 | 0.01 |
| 10 | 1.0 | SHI@10 s$^{-1}$ | 2.14 | 2.06 | — | — |

From the strain hardening behaviour measured by the values of the SHI@1 s$^{-1}$ one can already clearly distinguish between two groups of polymers: Linear and short-chain branched have a SHI@1 s$^{-1}$ significantly smaller than 0.30. In contrast, the Y and H-branched as well as hyper-branched materials have a SHI@1 s$^{-1}$ significantly larger than 0.30.

In comparing the strain hardening index at those five strain rates $\dot{\epsilon}_H$ of 0.10, 0.30, 1.0, 3.0 and 10 s$^{-1}$, the slope of SHI as a function of the logarithm of $\dot{\epsilon}_H$, log($\dot{\epsilon}_H$) is a characteristic measure for multi-branching. Therefore, a multi-branching index (MBI) is calculated from the slope of a linear fitting curve of SHI versus log($\dot{\epsilon}_H$):

$$SHI(\dot{\epsilon}_H) = c3 + MBI*\log(\dot{\epsilon}_H)$$

The parameters c3 and MBI are found through plotting the SHI against the logarithm of the Hencky strain rate log($\dot{\epsilon}_H$) and performing a linear fit of this data applying the least square method. Please confer to FIG. 2.

TABLE 2

Multi-branched-index (MBI)

| Property | Y and H branched PP A | Hyperbranched LDPE B | short-chain branched LLDPE C | Linear HDPE D |
|---|---|---|---|---|
| MBI | 0.04 | 0.45 | 0.10 | 0.01 |

The multi-branching index MBI allows now to distinguish between Y or H-branched polymers which show a MBI smaller than 0.05 and hyper-branched polymers which show a MBI larger than 0.15. Further, it allows to distinguish between short-chain branched polymers with MBI larger than 0.10 and linear materials which have a MBI smaller than 0.10.

Similar results can be observed when comparing different polypropylenes, i.e. polypropylenes with rather high branched structures have higher SHI and MBI-values, respectively, compared to their linear counterparts. Similar to the hyper-branched polyethylenes the new developed polypropylenes show a high degree of branching. However the polypropylenes according to the instant technology are clearly distinguished in the SHI and MBI-values when compared to known hyper-branched polyethylenes. Without being bound on this theory, it is believed, that the different SHI and MBI-values are the result of a different branching architecture. For this reason the new found branched polypropylenes according to the present technology are designated as multi-branched.

Combining both, strain hardening index (SHI) and multi-branching (MBI) index, the chain architecture can be assessed as indicated in Table 3:

TABLE 3

Strain Hardening Index (SHI) and Multi-branching Index (MBI) for various chain architectures

| Property | Y and H branched | Hyper-branched/Multi-branched | short-chain branched | linear |
|---|---|---|---|---|
| SHI@1.0 s$^{-1}$ | >0.30 | >0.30 | ≦0.30 | ≦0.30 |
| MBI | ≦0.10 | >0.10 | ≦0.10 | ≦0.10 |

C. Further Measuring Methods

Particle size distribution: Particle size distribution is measured via Coulter Counter LS 200 at room temperature with n-heptane as medium.

NMR

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chujoj, and T. Asakura, Polymer 29 138-43 (1988). and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

In detail: The number average molecular weight ($M_n$), the weight average molecular weight ($M_w$) and the molecular weight distribution (MWD) are measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11,500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior to sampling into the GPC instrument.

The xylene solubles (XS, wt.-%): Analysis according to the known method: 2.0 g of polymer is dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered and evaporated in nitrogen flow and the residue dried under vacuum at 90° C. until constant weight is reached.

$$XS\% = (100 \times m_1 \times v_0)/(m_0 \times v_1), \text{ wherein}$$

$m_0$=initial polymer amount (g)
$m_1$=weight of residue (g)
$v_0$=initial volume (ml)
$V_1$=volume of analyzed sample (ml)

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Vicat B: Vicat B is measured according to ISO 306 (50 N). Viact B is the temperature at which the specimen is penetrated to a depth of 1 mm by a flat-ended needle with a 1 sq. mm circular or square cross-section, under a 1000-gm load.

Melt strength and melt extensibility by Rheotens measurement:

The strain hardening behaviour of polymers is analysed by Rheotens apparatus (product of Göttfert, Siemensstr. 2, 74711 Buchen, Germany) in which a melt strand is elongated by drawing down with a defined acceleration. The haul-off force F in dependence of draw-down velocity v is recorded.

The test procedure is performed in a standard climatized room with controlled room temperature of T=23° C. The Rheotens apparatus is combined with an extruder/melt pump for continuous feeding of the melt strand. The extrusion temperature is 200° C.; a capillary die with a diameter of 2 mm and a length of 6 mm is used and the acceleration of the melt strand drawn down is 120 mm/s$^2$. The maximum points ($F_{max}$; $v_{max}$) at failure of the strand are characteristic for the strength and the drawability of the melt.

Stiffness Film TD (transversal direction), Stiffness Film MD (machine direction), Elongation at break TD and Elongation at break MD: these are determined according to ISO 527-3 (cross head speed: 1 mm/min).

Stiffness (tensile modulus) is measured according to ISO 527-2. The modulus is measured at a speed of 1 mm/min.

Haze and transparency: are determined according to ASTM D1003-92 (haze).

Gels: Gels are determined by visual counting using the following equipment

Gel Inspection System OCS

The OCS equipment is used for continuous gel determination (counting, classification and documentation) in PP films.

The equipment is assembled by the following components:
Extruder: Lab extruder ME25/5200, 3 heating zones (up to 450° C.)
 Screw diameter 25, L/D 25
 Die width 150 mm, die gap 0.5 mm
Chill Roll: CR8, automatic film tension regulation,
 Air knife, air jet, temperature range 20° C. to 100° C.
 Effective width 180 mm
Inspection System: FS-5, transmitted light principle
 Gel size 50µα to >1000µ
 Camera resolution 4096 Pixel
 50.000.000 Pixel/Second
 Illumination width 100 mm
Intrinsic viscosity: is measured according to DIN ISO 1628/1, October 1999 (in Decalin at 135° C.).
Porosity: is measured according to DIN 66135

Surface area: is measured according to ISO 9277

3. Examples

Example 1

C 1—Comparison

A Z/N polypropylene homopolymer of MFR 16 has been prepared using the Borstar process known in the art.

Example 2

C 2—Comparison

A Y or H shaped polypropylene homopolymer of MFR 24 has been prepared according to EP 0 879 830 example 1 and adjusting the amount of butadiene to obtain an MFR 24.

Example 3

C 3—Comparison

A blend of polypropylene homopolymer and LDPE has been prepared according to GB 992 388.

Example 4

E 1—Inventive

A support-free catalyst has been prepared as described in example 5 of WO 03/051934 whilst using an asymmetric metallocene dimethylsilyl [(2-methyl-(4'-tert.butyl)-4-phenyl-indenyl)(2-isopropyl-(4'-tert.butyl)-4-phenyl-indenyl)] zirconium dichloride.

Such catalyst has been used to polymerize a polypropylene homopolymer of MFR 30 in the Borstar process, known in the art.

All four materials have been tested on a pilot scale high speed extrusion coating line (Beloit line) where the maximum stable output has been determined.

Figure 5:
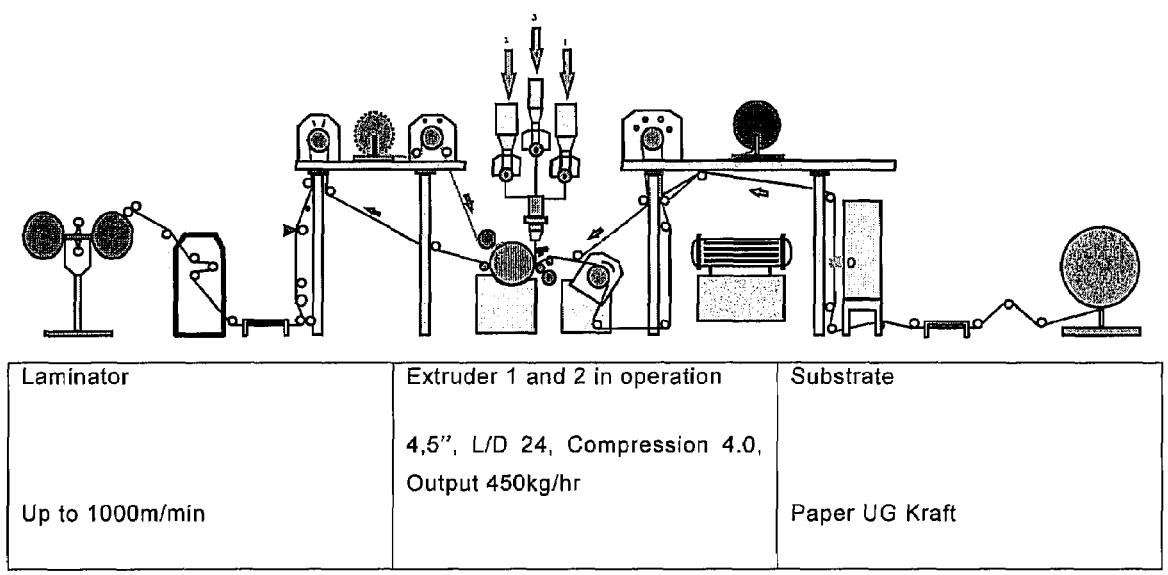
FIG. 5 depicts an embodiment of an extrusion coating setup.

In order to assess the processing behaviour of different polypropylenes systematic trials on a 450 kg/hr high speed extrusion coating line with a maximum coating speed of 1000 m/min has been carried out. The line is shown schematically in FIG. 5. The extruder barrel temperatures were set to 290° C., the screw speed has been adjusted to yield the respective coating weight, and the die width was in the order of 1 m.

The maximum line speed at which stable process conditions were obtained, has been assessed by increasing the line speed in steps of 100 m/min and keeping the coating weight constant at 20 g/m$^2$. As soon as either the edge-weaving exceeded a limiting value of 3 mm or the melt curtain became unstable, the experiment was stopped. The highest linespeed, which could be achieved according to this procedure, was taken as maximum draw down (DD). It should be mentioned, that the precision of this measure is not too high and the steps of 100 m/min yield rather large error bars.

TABLE 4

| Properties of the extrusion coated films | | | | | | |
|---|---|---|---|---|---|---|
| Property | Unit | Method | C 1 | C 2 | C 3 | E 1 |
| Purpose | | | Reference | Reference | Reference | Inventive |
| Literature | | | | | GB 992 388 | |
| MFR$_{230/2.16}$ | g/10 min | | 18 | 24 | 25 | 30 |

TABLE 4-continued

Properties of the extrusion coated films

| Property | Unit | Method | C 1 | C 2 | C 3 | E 1 |
|---|---|---|---|---|---|---|
| XS | Wt % | | 4.4 | 2.2 | >5 | 0.7 |
| C2 | Mol % | | 0 | 0 | 20 | 0 |
| g' | | | 1 | 0.8 | 0.7 | 0.7 |
| SHI@1 s$^{-1}$ | | | n/a | 0.9 | 1.2 | 0.6 |
| MBI | | | n/a | 0.05 | 1.5 | 0.5 |
| Tm | ° C. | | 162.6 | 161.9 | 160.1/108.8 | 157.7 |
| Hm | J/g | | 103.4 | 103.5 | 42.7/71.5 | 111.1 |
| Tc | ° C. | | 113.4 | 122.7 | 112.5/96.4 | 118.2 |
| Hc | J/g | | 96.4 | 101.7 | 66.7/43.6 | 102.1 |
| E (Film) | MPa | | 680 | 720 | 470 | 750 |
| Film Clarity | | | + | − | ~ | + |
| Vicat A | ° C. | | 154 | 152 | 132 | 150 |
| Vicat B | ° C. | | 84 | 90 | <80 | 102 |
| F30 | cN | | <3 | 3.7 | 4.3 | 5.0 |
| V30 | mm/s | | <120 | 235 | 290 | 165 |
| Line Speed | m/min | Beloit (intl) | 80 | 500 | 300 | 300 |

In order to investigate the influence of comonomer content on the Vicat B softening temperature, a further set of experiments has been conducted. For that purpose the metallocene catalyzed polypropylenes E 2, E 3 and E 4 have been prepared with the same catalyst and polymerization procedure as used for E 1. However, the ethylene content has been varied. E 2 was prepared without ethylene to yield a polypropylene homopolymer. E 3 and E 4 were prepared in presence of ethylene to yield random copolymers with ethylene content 4.0 mol % (E 3) and 3.9 mol % (E 4).

The comparison polymers C 4, C 5 and C 6 are made with Ziegler-Natta catalysts in the same process. C 4 is a polypropylene homopolymer, C 5 is a random copolymer and contains 4.0 mol % ethylene, C 6 is a random copolymer and contains 7.0 mol % ethylene. Please confer to table 5 for the polymer properties.

TABLE 5

Properties of the compositions extrusion coated

| | | E 2 | E 3 | E 4 | C 4 | C 5 | C 6 |
|---|---|---|---|---|---|---|---|
| MFR | [g/10'] | 7.2 | 6 | 4.3 | 8 | 8 | 11 |
| C2 | [mol %] | 0 | 4 | 3.9 | 0 | 4 | 7 |
| XKL | [wt %] | 0.6 | 0.8 | 0.7 | 3.1 | 5.3 | 8.4 |
| Mw | [kg/mol] | 285 | 286 | 249 | 351 | 393 | 337 |
| Mn | [kg/mol] | 117 | 119 | 109 | 89 | 102 | 103 |
| Mw/Mn | | 2.4 | 2.4 | 2.3 | 3.9 | 3.8 | 3.1 |
| Tm1 | [° C.] | 157 | 140 | 157 | 163 | 148 | 138 |
| ΔHm | [J/g] | 106 | 34 | 29 | 106 | 89 | 80 |
| Tm2 | | — | 131 | 131 | — | — | — |
| ΔHm2 | | — | 56 | 53 | — | — | — |
| Tc | [° C.] | 120 | 105 | 106 | 115 | 103 | 96 |
| Tg | [° C.] | 2 | −0.1 | −2 | 1.9 | −2 | −6 |
| HDT/A | [° C.] | 57 | 51 | 52 | 52 | 49 | 44 |
| HDT/B | [° C.] | 99 | 79 | 80 | 78 | 67 | 62 |
| Vicat A | [° C.] | 150 | 130 | 131 | 154 | 138 | 124 |
| Vicat B | [° C.] | 103 | 80 | 81 | 86 | 73 | 58 |

Figure 6:
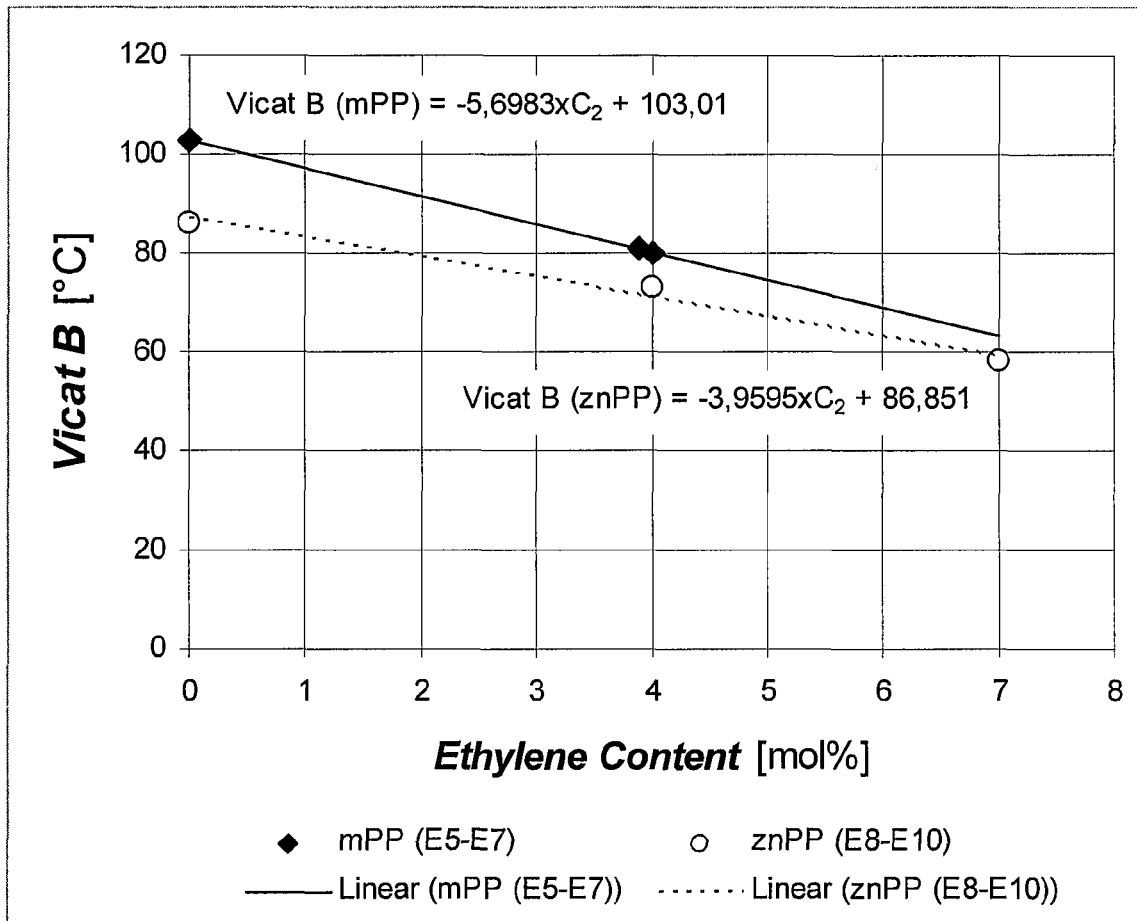
FIG. 6 is a graph depicting Vicat B of mPP and znPP as a function of ethylene content for homo- and copolymers.

It shows that the Vicat B temperature is significantly improved with the inventive examples. Please confer to FIG. 6.

The present technology has now been described in such full, clear, concise and exact terms as to enable a person familiar in the art to which it pertains, to practice the same. It is to be understood that the foregoing describes preferred embodiments and examples of the present technology and that modifications may be made therein without departing from the spirit or scope of the present technology as set forth in the claims. Moreover, while particular elements, embodiments and applications of the present technology have been shown and described, it will be understood, of course, that the present technology is not limited thereto since modifications can be made by those familiar in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the present technology, which is defined by the following claims as interpreted according to the principles of patent law, including the Doctrine of Equivalents. Further, all references cited herein are incorporated in their entirety.

The invention claimed is:

1. An article comprising a substrate, said substrate extrusion coated with a composition comprising a polypropylene material comprising propylene and up to 15% of a comonomer, wherein said polypropylene material is produced in the presence of an unsupported or self-supported, asymmetric metallocene catalyst, wherein the polypropylene material satisfies the equation:

$$\text{Vicat } B \ [° C.] > -3.96 \cdot C_x \ [\text{mol \%}] + 86.85;$$

wherein:
  a) Vicat B is the heat resistance, according to ISO 306 (50 N), of the polypropylene material; and
  b) $C_x$ is the comonomer content in said polypropylene material; and
wherein the polypropylene material has a strain hardening index of at least 0.30 measured by a deformation rate of 1.00 s$^{-1}$ at a temperature of 180° C., wherein the strain hardening index is defined as a slope of a logarithm to the basis 10 of the tensile stress growth function as a function of a logarithm to the basis 10 of the Hencky strain in the range of Hencky strains between 1 and 3.

2. The article of claim 1, wherein said polypropylene material has xylene solubles of less than 2.0 percent by weight.

3. The article of claim 2, wherein said composition comprises a propylene homopolymer, and wherein said homopolymer has a heat resistance measured according to Vicat B of at least 90° C.

4. The article of claim 2, wherein said composition comprises a propylene copolymer, and wherein said copolymer has a heat resistance measured according to Vicat B of at least 73° C.

5. The article of claim 2, wherein the polypropylene material has a branching index g' of less than 1.00.

6. The article of claim 3, wherein the polypropylene material has a branching index g' of less than 1.00.

7. The article of claim 4, wherein the polypropylene material has a branching index g' of less than 1.00.

8. The article of claim 2, wherein the polypropylene material has a multi-branching index of at least 0.15, wherein the multi-branching index is defined as a slope of the strain hardening index as a function of the logarithm to the basis 10 of a Hencky strain rate, defined as (log(dϵ/dt)), wherein:
   a) dϵ/dt is the deformation rate,
   b) ϵ is the Hencky strain, and
   c) the strain hardening index is measured at a temperature of 180° C.

9. The article of claim 3, wherein the polypropylene material has a multi-branching index of at least 0.15, wherein the multi-branching index is defined as a slope of the strain hardening index as a function of the logarithm to the basis 10 of a Hencky strain rate, defined as (log(dϵ/dt)), wherein:
   a) dϵ/dt is the deformation rate,
   b) ϵ is the Hencky strain, and
   c) the strain hardening index is measured at a temperature of 180° C.

10. The article of claim 4, wherein the polypropylene material has a multi-branching index of at least 0.15, wherein the multi-branching index is defined as a slope of the strain hardening index as a function of the logarithm to the basis 10 of a Hencky strain rate, defined as (log(dϵ/dt)), wherein:
    a) dϵ/dt is the deformation rate,
    b) ϵ is the Hencky strain, and
    c) the strain hardening index is measured at a temperature of 180° C.

11. The article of claim 2, wherein said composition extrusion coated on the substrate comprises gels only having a diameter less than or equal to 500 μm, and wherein said gels are not more than 100 gels per square meter.

12. The article of claim 2, wherein the polypropylene material has an mmmm pentad concentration of higher than 90%.

13. The article of claim 2, wherein the polypropylene material has a meso pentad concentration of higher than 90%.

14. The article of claim 2, wherein the polypropylene material has a melting point of at least 125° C.

15. The article of claim 2, wherein the polypropylene material is multimodal.

16. The article of claim 4, wherein the comonomer of the propylene copolymer is ethylene.

17. The article of claim 16, wherein the total amount of comonomer in the propylene copolymer is up to 10 mol %.

18. The article of claim 2, wherein the article is a packaging material.

19. The article of claim 2, wherein the polypropylene has been produced in the presence of a catalyst system comprising an asymmetric catalyst, and wherein the catalyst system has a porosity of less than 1.40 ml/g.

20. The article of claim 19, wherein the asymmetric catalyst is dimethylsilyl [(2-methyl-(4'-tert, butyl)-4-phenyl-indenyl)(2-isopropyl-(4'-tert, butyl)-4-phenyl-indenyl)]zirconium dichloride.

21. The article of claim 2, wherein the substrate is selected from the group consisting of paper, paperboard, fabrics and metal foils.

22. An article comprising a substrate, said substrate extrusion coated with a composition comprising a polypropylene material, said polypropylene material comprising propylene and up to 15% comonomer, wherein said polypropylene material is produced in the presence of an unsupported or self-supported, asymmetric metallocene catalyst, and wherein said polypropylene has:
   a) a branching index g' of less than 1.00; and
   b) a strain hardening index of at least 0.30 measured by a deformation rate of $1.00 \, s^{-1}$ at a temperature of 180° C., wherein the strain hardening index is defined as a slope of a logarithm to the basis 10 of a tensile stress growth function as a function of a logarithm to the basis 10 of a Hencky strain in the range of Hencky strains between 1 and 3.

23. The article of claim 22, wherein the polypropylene material has a multi-branching index of at least 0.15, wherein the multi-branching index is defined as a slope of the strain hardening index as a function of a logarithm to the basis 10 of the Hencky strain rate.

24. The article of claim 22, wherein the unsupported or self-supported asymmetric catalyst has a porosity of less than 1.40 ml/g.

25. The article of claim 24, wherein said polypropylene material has xylene solubles of less than 2.0 percent by weight, and wherein the polypropylene material are represented by the equation:

$$\text{Vicat } B \, [° C.] > -3.96 \cdot C_x \, [\text{mol \%}] + 86.85;$$

wherein:
   a) Vicat B is the heat resistance, according to ISO 306 (50 N), of the polypropylene material; and
   b) $C_x$ is the comonomer content in said polypropylene material.

26. The article of claim 25, wherein said composition comprises a propylene homopolymer, and wherein said homopolymer has a heat resistance measured according to Vicat B of at least 90° C.

27. The article of claim 25, wherein said composition comprises a propylene copolymer, and wherein said copolymer has a heat resistance measured according to Vicat B of at least 73° C.

28. An article comprising a substrate, said substrate extrusion coated with a composition comprising a polypropylene material comprising propylene and up to 15% of a comonomer, wherein said polypropylene material is produced in the presence of an unsupported asymmetric metallocene catalyst, wherein the polypropylene material has a multi-branching index of at least 0.15 and a strain hardening index of at least 0.30 measured by a deformation rate of $1.00 \, s^{-1}$ at a temperature of 180° C., wherein the multi-branching index is defined as a slope of the strain hardening index as a function of the logarithm to the basis 10 of a Hencky strain rate, defined as (log(dϵ/dt)), wherein:
   a) dϵ/dt is the deformation rate,
   b) ϵ is the Hencky strain, and
   c) the strain hardening index is measured at a temperature of 180° C.,
   wherein the strain hardening index is defined as a slope of a logarithm to the basis 10 of the tensile stress growth function as a function of a logarithm to the basis 10 of the Hencky strain in the range of Hencky strains between 1 and 3.

29. The article of claim 28, wherein the polypropylene has a branching index g' of less than 1.00.

30. The article of claim 29, wherein the polypropylene has been produced in the presence of a catalyst system comprising an asymmetric catalyst, and wherein the catalyst system has a porosity of less than 1.40 ml/g.

31. A process for manufacturing an article comprising the steps of:
   a) providing an article comprising a substrate;
   b) extrusion coating the substrate with a composition, said composition comprising a polypropylene material comprising propylene and up to 15% comonomer, wherein said polypropylene material is produced in the presence of an unsupported or self-supported asymmetric metallocene catalyst;
   wherein the polypropylene material used to coat the substrate are represented by the equation:

$$\text{Vicat } B\,[^\circ C.] > -3.96 \cdot C_x\,[\text{mol \%}] + 86.85;$$

wherein:
   a) Vicat B is the heat resistance, according to ISO 306 (50 N), of the polypropylene material; and
   b) $C_x$ is the comonomer content in said polypropylene; said comonomer being selected from the comomomers sufficient for forming a polypropylene material that satisfies the equation:

$$\text{Vicat } B\,[^\circ C.] > -3.96 \cdot C_x\,[\text{mol \%}] + 86.85;$$

wherein said polypropylene material has xylene solubles of less than 2.0 percent by weight and wherein the polypropylene material has a strain hardening index of at least 0.30 measured by a deformation rate of $1.00\ s^{-1}$ at a temperature of 180° C., wherein the strain hardening index is defined as a slope of a logarithm to the basis 10 of the tensile stress growth function as a function of a logarithm to the basis 10 of the Hencky strain in the range of Hencky strains between 1 and 3.

32. The process of claim 31, wherein said substrate is selected from the group consisting of paper, paperboard, fabrics and metal foils.

* * * * *